United States Patent
Lasserre et al.

(10) Patent No.: US 9,142,036 B2
(45) Date of Patent: Sep. 22, 2015

(54) METHODS FOR SEGMENTING AND ENCODING AN IMAGE, AND CORRESPONDING DEVICES

(71) Applicant: CANON KABUSHIKI KAISHA, Tokyo (JP)

(72) Inventors: Sébastien Lasserre, Rennes (FR); Fabrice Le Leannec, Mouaze (FR)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 13/861,266

(22) Filed: Apr. 11, 2013

(65) Prior Publication Data
US 2013/0272621 A1    Oct. 17, 2013

(30) Foreign Application Priority Data

Apr. 13, 2012  (GB) .................................. 1206527.2
Sep. 28, 2012  (GB) .................................. 1217460.3
Dec. 24, 2012  (GB) .................................. 1223382.1

(51) Int. Cl.
  *G06T 9/00*    (2006.01)
(52) U.S. Cl.
  CPC ........................................ *G06T 9/00* (2013.01)
(58) Field of Classification Search
  CPC ........ G06T 9/00; H04N 19/09; H04N 19/147; H04N 19/40; H04N 19/117; H04N 19/122; H04N 19/129
  USPC ........ 382/233, 251, 248; 375/240.12, 240.24, 375/240.18, 240.03
  See application file for complete search history.

(56) References Cited

U.S. PATENT DOCUMENTS

| 5,654,760 A | 8/1997 | Ohtsuki |
| 5,739,863 A | 4/1998 | Ohtsuki |
| 2005/0213657 A1* | 9/2005 | Kodama et al. .......... 375/240.03 |

(Continued)

FOREIGN PATENT DOCUMENTS

WO    2006119443 A2    11/2006

OTHER PUBLICATIONS

Yi Ma, "Segmentation of Multivariate Mixed Data via Lossy Data Coding and Compression", 2007, IEEE Transactions on Pattern Analysis and Machine Intelligence, vol. 29, No. 9, pp. 1546-1562.

(Continued)

*Primary Examiner* — Mekonen Bekele
(74) *Attorney, Agent, or Firm* — Canon USA Inc. IP Division

(57) ABSTRACT

A frame of pixels is segmented into a plurality of blocks each having a block type by a method including the steps of:
  a) performing an initial segmentation of the frame into a set of initial blocks, thus determining, for each initial block, a block type associated with the concerned initial block;
  b) determining, for each block type, an associated set of quantizers based on data corresponding to pixels of blocks having said block type;
  c) selecting, among a plurality of possible segmentations defining an association between each block of this segmentation and an associated block type, the segmentation which minimizes an encoding cost estimated based on a measure of the rate necessary for encoding each block using the set of quantizers associated with the block type of the encoded block according to the concerned segmentation.

30 Claims, 14 Drawing Sheets

(56) References Cited

U.S. PATENT DOCUMENTS

| | | | |
|---|---|---|---|
| 2006/0133481 A1* | 6/2006 | Chujoh | 375/240.03 |
| 2008/0291295 A1* | 11/2008 | Kato et al. | 348/231.99 |
| 2009/0257489 A1* | 10/2009 | Karczewicz et al. | 375/240.03 |
| 2011/0170608 A1 | 7/2011 | Shi et al. | |
| 2012/0201300 A1* | 8/2012 | Kim et al. | 375/240.12 |
| 2014/0098856 A1* | 4/2014 | Gu et al. | 375/240.03 |

OTHER PUBLICATIONS

David A. Huffman, "A Method for the Construction of Minimum-Redundancy Codes", Proceedings of the I.R.E., Sep. 1952, pp. 1098-1101.

Philip A. Chou et al., "Entropy-Constrained Vector Quantization", IEEE Transactions on Acoustics, Speech, and Signal Processing, Jan. 1989, pp. 31-42, vol. 37, No. 1.

H.W. Kuhn et al., "Nonlinear Programming", Proceedings of the 2nd Berkley Symposium, Berkley, 1951, pp. 481-492, University of California Press.

T.M. Cover et al., excerpts of "Rate Distortion Theory" from "Elements of Information Theory", 2006, pp. 306-319, Second Edition, ed. Wiley.

Jean Serra, excerpts from "Image Analysis and Mathematical Morphology", Feb. 11, 1984, pp. 436-441, 458 and 459, Academic Press, vol. 1.

Guillaume Laroche et al., "Robust solution for the AMVP parsing issue", Joint Collaborative Team on Video Coding (JCT-VC) of ITU-T SG16 WP3 and ISO/IEC JTC1/SC29/WG11, Mar. 16-23, 2011, pp. 1-10 (XP030048307).

Danny Hong et al., "Scalability support in HEVC", Joint Collaborative Team on Video Coding (JCT-VC) of ITU-T SG16 WP3 and ISO/IEC JTC1/SC29/WG11, Jul. 14-22, 2011, pp. 1-15 (XP030049273).

Jill Boyce et al., "Information for HEVC scalability extension", Joint Collaborative Team on Video Coding (JCT-VC) of ITU-T SG16 WP3 and ISO/IEC JTC1/SC29/WG11, Jul. 2011, pp. 1-7 (XP030050221).

Sébastien Lasserre et al., "Description of the scalable video coding technology proposal by Canon Research Centre France", Joint Collaborative Team on Video Coding (JCT-VC) of ITU-T SG16 WP3 and ISO/IEC JTC1/SC29/WG11, Oct. 10-19, 2012, pp. 1-78 (XP030112973).

Sébastien Lasserre et al., "Low complexity scalable extension of HEVC intra pictures based on content statistics", Joint Collaborative Team on Video Coding (JCT-VC) of ITU-T SG16 WP3 and ISO/IEC JTC1/SC29/WG11, Apr. 26, 2012, pp. 1-31 (XP030052774).

* cited by examiner

METHODS FOR SEGMENTING AND ENCODING AN IMAGE, AND CORRESPONDING DEVICES

This application claims benefit under 35 USC §119 of United Kingdom applications No. 1206527.2 filed on Apr. 13, 2012, No. 1217460.3 filed on Sep. 28, 2012 and No. 1223382.1 filed on Dec. 24, 2012, which are incorporated herein by reference.

FIELD OF THE INVENTION

The present invention concerns methods for segmenting and encoding an image comprising blocks of pixels, and associated devices.

The invention is particularly useful for the encoding of digital video sequences made of images or "frames".

BACKGROUND OF THE INVENTION

Video compression algorithms, such as those standardized by the standardization organizations ITU, ISO, and SMPTE, exploit the spatial and temporal redundancies of images in order to generate bit-streams of data of smaller size than original video sequences. These powerful video compression tools, known as spatial (or intra) and temporal (or inter) predictions, make the transmission and/or the storage of video sequences more efficient.

Video encoders and/or decoders (codecs) are often embedded in portable devices with limited resources, such as cameras or camcorders. Conventional embedded codecs can process at best high definition (HD) digital videos, i.e 1080×1920 pixel frames.

Real time encoding is however limited by the limited resources of the portable devices, especially regarding slow access to the working memory (e.g. random access memory, or RAM) and regarding the central processing unit (CPU).

This is particularly striking for the encoding of ultra-high definition (UHD) digital videos that are about to be handled by the latest cameras. This is because the amount of pixel data to encode or to consider for spatial or temporal prediction is huge.

UHD is typically four times (4 k2 k pixels) the definition of an HD video which is the current standard definition video. Furthermore, very ultra high definition, which is sixteen times that definition (i.e. 8 k4 k pixels), is even being considered in a more long-term future.

SUMMARY OF THE INVENTION

Faced with these encoding constraints in terms of limited power and memory access bandwidth, the inventors provide a UHD codec with low complexity based on scalable encoding.

Basically, the UHD video is encoded into a base layer and one or more enhancement layers.

The base layer results from the encoding of a reduced version of the UHD images, in particular having a HD resolution, with a standard existing codec (e.g. H.264 or HEVC—High Efficiency Video Coding). As stated above, the compression efficiency of such a codec relies on spatial and temporal predictions.

Further to the encoding of the base layer, an enhancement image is obtained from subtracting an interpolated (or up-scaled) decoded image of the base layer from the corresponding original UHD image. The enhancement images, which are residuals or pixel differences with UHD resolution, are then encoded into an enhancement layer.

FIG. 1 illustrates such approach at the encoder 10.

An input raw video 11, in particular a UHD video, is down-sampled 12 to obtain a so-called base layer, for example with HD resolution, which is encoded by a standard base video coder 13, for instance H.264/AVC or HEVC. This results in a base layer bit stream 14.

To generate the enhancement layer, the encoded base layer is decoded 15 and up-sampled 16 into the initial resolution (UHD in the example) to obtain the up-sampled decoded base layer.

The latter is then subtracted 17, in the pixel domain, from the original raw video to get the residual enhancement layer X.

The information contained in X is the error or pixel difference due to the base layer encoding and the up-sampling. It is also known as a "residual".

A conventional block division is then applied, for instance a homogenous 8×8 block division (but other divisions with non-constant block size are also possible).

Next, a DCT transform 18 is applied to each block to generate DCT blocks forming the DCT image $X_{DCT}$ having the initial UHD resolution.

This DCT image $X_{DCT}$ is encoded in $X_{DCT,Q}^{ENC}$ by an enhancement video encoding module 19 into an enhancement layer bit stream 20.

The encoded bit-stream EBS resulting from the encoding of the raw video 11 is made of:
- the base layer bit-stream 14 produced by the base video encoder 13;
- the enhancement layer bit-stream 20 encoded by the enhancement video encoder 19; and
- parameters 21 determined and used by the enhancement video encoder.

Examples of those parameters are given here below.

FIG. 2 illustrates the associated processing at the decoder 30 receiving the encoded bit-stream EBS.

Part of the processing consists in decoding the base layer bit-stream 14 by the standard base video decoder 31 to produce a decoded base layer. This decoded base layer is up-sampled 32 into the initial resolution, i.e. UHD resolution.

In another part of the processing, both the enhancement layer bit-stream 20 and the parameters 21 are used by the enhancement video decoding module 33 to generate a dequantized DCT image $\overline{X}_{Q^{-1}}^{DEC}$. The image $\overline{X}_{Q^{-1}}^{DEC}$ is the result of the quantization and then the inverse quantization on the image $X_{DCT}$.

An inverse DCT transform 34 is then applied to each block of the image X to obtain the decoded residual $\overline{X}_{IDCT,Q^{-1}}^{DEC}$, (of UHD resolution) in the pixel domain.

This decoded residual $\overline{X}_{IDCT,Q^{-1}}^{DEC}$ is added 35 to the up-sampled decoded base layer to obtain decoded images of the video.

Filter post-processing, for instance with a deblocking filter 36, is finally applied to obtain the decoded video 37 which is output by the decoder 30.

Reducing UHD encoding complexity relies on simplifying the encoding of the enhancement images at the enhancement video encoding module 19 compared to the conventional encoding scheme.

To that end, the inventors dispense with the temporal prediction and possibly the spatial prediction when encoding the UHD enhancement images. This is because the temporal prediction is very expensive in terms of memory bandwidth consumption, since it often requires accessing other enhancement images.

While this simplification reduces by 80% the slow memory random access bandwidth consumption during the encoding process, not using those powerful video compression tools may deteriorate the compression efficiency, compared to the conventional standards.

In this respect, the inventors have developed several additional tools for increasing the efficiency of the encoding of those enhancement images.

FIG. 3 illustrates an embodiment of the enhancement video encoding module 19 (or "enhancement layer encoder") that is provided by the inventors.

In this embodiment, the enhancement layer encoder models 190 the statistical distribution of the DCT coefficients within the DCT blocks of a current enhancement image by fitting a parametric probabilistic model.

This fitted model becomes the channel model of DCT coefficients and the fitted parameters are output in the parameter bit-stream 21 coded by the enhancement layer encoder. As will become more clearly apparent below, a channel model may be obtained for each DCT coefficient position within a DCT block, i.e. each type of coefficient or each DCT channel, based on fitting the parametric probabilistic model onto the corresponding collocated DCT coefficients throughout all the DCT blocks of the image $X_{DCT}$ or of part of it.

Based on the channel models, quantizers may be chosen 191 from a pool of pre-computed quantizers dedicated to each DCT channel as further explained below.

The chosen quantizers are used to perform the quantization 192 of the DCT image $X_{DCT}$ to obtain the quantized DCT image $X_{DCT,Q}$.

Lastly, an entropy encoder 193 is applied to the quantized DCT image $X_{DCT,Q}$ to compress data and generate the encoded DCT image $X_{DCT,Q}^{ENC}$ which constitutes the enhancement layer bit-stream 20.

The associated enhancement video decoder 33 is shown in FIG. 4.

From the received parameters 21, the channel models are reconstructed and quantizers are chosen 330 from the pool of quantizers. As further explained below, quantizers used for dequantization may be selected at the decoder side using a process similar to the selection process used at the encoder side, based on parameters defining the channel models (which parameters are received in the data stream). Alternatively, the parameters transmitted in the data stream could directly identify the quantizers to be used for the various DCT channels.

An entropy decoder 331 is applied to the received enhancement layer bit-stream 20 ($X=X_{DCT,Q}^{ENC}$) to obtain the quantized DCT image $\overline{X}^{DEC}$.

A dequantization 332 is then performed by using the chosen quantizers, to obtain a dequantized version of the DCT image $\overline{X}_{Q^{-1}}^{DEC}$.

The channel modelling and the selection of quantizers are some of the additional tools as introduced above.

As will become apparent from the explanation below, those additional tools may be used for the encoding of any image, regardless of the enhancement nature of the image, and furthermore regardless of its resolution.

As briefly introduced above, the invention is particularly advantageous when encoding images without prediction.

According to a first aspect, the invention provides a method for segmenting a frame of pixels into a plurality of blocks each having a block type, comprising the steps of:

a) performing an initial segmentation of the frame into a set of initial blocks, thus determining, for each initial block, a block type associated with the concerned initial block;

b) determining, for each block type, an associated set of quantizers based on data corresponding to pixels of blocks having said block type;

c) selecting, among a plurality of possible segmentations defining an association between each block of this segmentation and an associated block type, the segmentation which minimizes an encoding cost estimated based on a measure of the rate necessary for encoding each block using the set of quantizers associated with the block type of the encoded block according to the concerned segmentation.

The segmentation can thus be modified to optimize the encoding cost.

The encoding cost may combine said measure of the rate and a measure of the distortion generated by encoding and decoding each block using the set of quantizers associated with the block type of the encoded block according to the concerned segmentation. An encoding cost estimated on such a basis is particularly interesting in practice.

Steps b) and c) may be iterated and the segmentation used at an iteration of step b) may then be the segmentation selected at the preceding iteration of step c).

As the segmentation has an influence on the distribution of block types and of data to be considered with respect to each block type, it is particularly interesting to loop on steps b) and c) to obtain further optimization of the segmentation. Steps b) and c) are for instance iterated until a convergence criterion is detected (e.g. if the segmentation does not evolve from an iteration to the next iteration) or a predetermined number of iterations is reached.

Said encoding cost may be a Lagrangian cost, such as a cost of the type $$\frac{D}{\lambda} + R \text{ or } \frac{D^2}{\lambda} + R.$$

It is proposed in practice, as further explained below to compute the encoding cost using an encoding merit at the frame level and a number of blocks per area unit for the concerned block type. On the other hand, the measure of the rate may be computed based on the set of quantizers associated with the concerned block type and on parameters representative of statistical distributions of transformed coefficients of blocks having the concerned block type.

In the context of a colour picture (possibly in a video sequence) comprising luminance and chrominance frames, the encoding cost may include a cost for luminance, taking into account luminance distortion generated by encoding and decoding a luminance block using the set of quantizers associated with the concerned block type, and a cost for chrominance, taking into account chrominance distortion generated by encoding and decoding a chrominance block using the set of quantizers associated with the concerned block type; said luminance distortion and said chrominance distortion may furthermore be linked by a predetermined relationship, which makes it possible to distribute encoding between the luminance frame and the chrominance frame(s) in a desired manner.

In order to practically perform the selection of the optimizing segmentation with a reduced calculation cost (compared to testing each and every possible combination), it is proposed that the step of selecting the segmentation include processing a part of said frame, said part having a first size, by:

for each of a plurality of blocks having a second size and partitioning said part, selecting the block type corresponding to said second size and which minimizes, by use of the associated set of quantizers, the encoding cost for the concerned block;

summing the minimized encoding costs thus obtained over said plurality of blocks;

comparing the summed encoding costs with at least an encoding cost for said part obtained by use of a set of quantizers associated with a block type corresponding to said first size.

Thus, by use of the property of additivity of the cost, the minimizing segmentation can be found without considering every possible combination of block types.

According to the embodiment described below, step b) may include:

transforming pixel values for said blocks having said block type into a set of coefficients each having a coefficient type;

determining, for each coefficient type, at least one parameter representative of a probabilistic distribution of coefficients having the concerned coefficient type;

selecting, for each coefficient type, a quantizer depending on the parameter for the concerned coefficient type and on a block merit associated with said block type.

The selected segmentation is for instance represented as a quad tree having a plurality of levels, each associated with a block size, and leaves associated with blocks and having a value indicating either a label for the concerned block or a subdivision of the concerned block. The quad tree may be compressed using an arithmetic entropy coding (i.e. performed by an arithmetic entropy coder).

It is also provided a method for encoding a frame of pixels comprising the following steps:

segmenting a frame of pixels into a plurality of blocks each having a block type using a method as presented above;

for each block, transforming pixel values into a set of coefficients each having a coefficient type;

for each block type, determining, for each coefficient type, at least one parameter representative of a probabilistic distribution of coefficients having the concerned coefficient type;

for each block type, selecting, for each coefficient type, a quantizer depending on the parameter for the concerned coefficient type and on a block merit associated with the concerned block type;

for each block, quantizing at least one coefficient having a given coefficient type using the quantizer selected for this given coefficient type and for the block type of the concerned block;

coding the quantized coefficients.

In a corresponding manner, the invention provides a device for processing data representing a frame of pixels, thereby segmenting said frame of pixels into a plurality of blocks each having a block type, comprising:

a module for performing an initial segmentation of the frame into a set of initial blocks, thus determining, for each initial block, a block type associated with the concerned initial block;

a determination module for determining, for each block type, an associated set of quantizers based on data corresponding to pixels of blocks having said block type;

a selection module for selecting, among a plurality of possible segmentations defining an association between each block of this segmentation and an associated block type, the segmentation which minimizes an encoding cost estimated based on a measure of the rate necessary for encoding each block using the set of quantizers associated with the block type of the encoded block according to the concerned segmentation.

The device may be adapted to control the determination module to use a segmentation selected by the selection module and thus to iteratively perform steps b) and c) mentioned above. The device may further be adapted to control the determination module and the selection module to operate successively until a convergence criterion is detected or a predetermined number of iterations is reached.

The invention also provides a device for encoding a frame of pixels comprising:

a module for segmenting a frame of pixels into a plurality of blocks each having a block type using a device as just mentioned;

a module for transforming, for each block, pixel values into a set of coefficients each having a coefficient type;

a module for determining, for each block type and for each coefficient type, at least one parameter representative of a probabilistic distribution of coefficients having the concerned coefficient type;

a module for selecting, for each block type and for each coefficient type, a quantizer depending on the parameter for the concerned coefficient type and on a block merit associated with the concerned block type;

a module for quantizing, for each block, at least one coefficient having a given coefficient type using the quantizer selected for this given coefficient type and for the block type of the concerned block;

a module for coding the quantized coefficients.

Optional features proposed above in connection with the methods may also apply to the devices just mentioned.

The invention also provides information storage means, possibly totally or partially removable, able to be read by a computer system, comprising instructions for a computer program adapted to implement a method as mentioned above, when this program is loaded into and executed by the computer system.

The invention also provides a computer program product able to be read by a microprocessor, comprising portions of software code adapted to implement an a method as mentioned above, when it is loaded into and executed by the microprocessor.

The invention also provides an encoding device for encoding an image substantially as herein described with reference to, and as shown in, FIGS. 1 and 3 of the accompanying drawings.

According to another aspect of the present invention, there is provided a method of encoding video data comprising:

receiving video data having a first resolution, downsampling the received first-resolution video data to generate video data having a second resolution lower than said first resolution, and encoding the second resolution video data to obtain video data of a base layer having said second resolution; and decoding the base layer video data, upsampling the decoded base layer video data to generate decoded video data having said first resolution, forming a difference between the generated decoded video data having said first resolution and said received video data having said first resolution to generate residual data, and compressing the residual data to generate video data of an enhancement layer.

Preferably, the compression of the residual data employs a method embodying the aforesaid first aspect of the present invention.

The arithmetic entropy coding, mentioned above in relation with the quad tree representing the segmentation, may for instance use, when coding the segmentation relating to a given block, conditional probabilities for the various possible leaf values depending on a state of a block in the base layer co-located with said given block.

In one embodiment the encoding of the second resolution video data to obtain video data of a base layer having said second resolution and the decoding of the base layer video data are in conformity with HEVC.

In one embodiment, the first resolution is UHD and the second resolution is HD. As already noted, it is proposed that the compression of the residual data does not involve temporal prediction and/or that the compression of the residual data also does not involve spatial prediction.

The invention also provides a method for decoding video data comprising:

receiving video data of a base layer, video data of an enhancement layer, a table of conditional probabilities and a coded quad-tree representing, by leaf values, an image segmentation into blocks for the enhancement layer;

decoding video data of the base layer to generate decoded base layer video data having a second resolution, lower than a first resolution, and upsampling the decoded base layer video data to generate upsampled video data having the first resolution;

for at least one block represented in the quad-tree, determining the probabilities respectively associated with the possible leaf values based on the received table and depending on a state of a block in the base layer co-located with said block;

decoding the coded quad-tree to obtain the segmentation, including arithmetic entropy decoding the leaf value associated with said block using the determined probabilities;

decoding, using the obtained segmentation, video data of the enhancement layer to generate residual data having the first resolution;

forming a sum of the upsampled video data and the residual data to generate enhanced video data.

At the encoder side, the invention correspondingly provides a method for encoding video data comprising:

downsampling video data having a first resolution to generate video data having a second resolution lower than said first resolution, and encoding the second resolution video data to obtain video data of a base layer having said second resolution;

decoding the base layer video data, upsampling the decoded base layer video data to generate decoded video data having said first resolution, forming a difference between the generated decoded video data having said first resolution and said received video data having said first resolution to generate residual data, compressing the residual data to generate video data of an enhancement layer, including determining an image segmentation into blocks for the enhancement layer, wherein the segmentation is represented as a quad-tree having a plurality of levels, each associated with a block size, and leaves associated with blocks and having a value indicating either a label for the concerned block or a subdivision of the concerned block;

arithmetic entropy coding the quad-tree using, when coding the segmentation relating to a given block, conditional probabilities for the various possible leaf values depending on a state of a block in the base layer co-located with said given block.

In a corresponding manner, the invention provides a device for decoding video data comprising:

a reception module for receiving video data of a base layer, video data of an enhancement layer, a table of conditional probabilities and a coded quad-tree representing, by leaf values, an image segmentation into blocks for the enhancement layer;

a base layer decoding module for decoding video data of the base layer to generate decoded base layer video data having a second resolution, lower than a first resolution, and upsampling the decoded base layer video data to generate upsampled video data having the first resolution;

a probability determining module for determining, for at least one block represented in the quad-tree, the probabilities respectively associated with the possible leaf values based on the received table and depending on a state of a block in the base layer co-located with said block;

a quad-tree decoding module for decoding the coded quad-tree to obtain the segmentation, the quad-tree decoding module being configured arithmetic entropy decode the leaf value associated with said block using the determined probabilities;

an enhancement layer decoding module for decoding, using the obtained segmentation, video data of the enhancement layer to generate residual data having the first resolution;

a summation module for forming a sum of the upsampled video data and the residual data to generate enhanced video data.

The invention also provides a device for encoding video data comprising:

a base layer encoding module for downsampling video data having a first resolution to generate video data having a second resolution lower than said first resolution, and for encoding the second resolution video data to obtain video data of a base layer having said second resolution;

a residual data generating module for decoding the base layer video data, for upsampling the decoded base layer video data to generate decoded video data having said first resolution, for forming a difference between the generated decoded video data having said first resolution and said received video data having said first resolution to generate residual data, an enhancement layer encoding module for compressing the residual data to generate video data of an enhancement layer, the enhancement layer encoding module being configured to determine an image segmentation into blocks for the enhancement layer, wherein the segmentation is represented as a quad-tree having a plurality of levels, each associated with a block size, and leaves associated with blocks and having a value indicating either a label for the concerned block or a subdivision of the concerned block;

an arithmetic entropy coding module for arithmetic entropy coding the quad-tree using, when coding the segmentation relating to a given block, conditional probabilities for the various possible leaf values depending on a state of a block in the base layer co-located with said given block.

According to another aspect of the invention, it is proposed a method for encoding a block of pixel values of an enhancement layer frame in a scalable encoder. The method comprises:

encoding the block to encode in the form of a flag indicating that, for decoding the block, the decoded pixel values of a collocated block of a lower layer frame are used.

According to one embodiment, the method further comprises choosing an encoding mode among a plurality of encoding modes, one of the modes comprising encoding the block in the form of a flag indicating that, for decoding the block, the decoded pixel values of a collocated block of a lower layer frame are used.

According to one embodiment, the method further comprises performing an interpolation on the decoded pixel values of said collocated block of the lower layer frame.

According to one embodiment, the method further comprises applying a post-filtering on the decoded pixel values of said collocated block of the lower layer frame.

According to another aspect of the invention it is proposed, a corresponding device for encoding a block of pixel values of an enhancement layer frame in a scalable encoder. The device comprises means for encoding a block in the form of a flag indicating that, for decoding the block, the decoded pixel values of a collocated block of a lower layer frame are used.

According to one embodiment, the device further comprises means for choosing an encoding mode among a plurality of encoding modes, one of the modes comprising encoding the block in the form of a flag indicating that for decoding the block, the decoded pixel values of a collocated block of a lower layer frame are used.

According to one embodiment, the device further comprises interpolation means for performing interpolation on the decoded pixel values of said collocated block of the lower layer frame.

According to one embodiment, the device further comprises post-filtering means for filtering the decoded pixel values of said collocated block of the lower layer frame.

According to another aspect of the invention it is proposed a method for decoding a block of pixel values of an enhancement layer frame in a scalable decoder. If a flag is received indicating that for decoding the block the decoded pixel values of a collocated block of a lower layer frame are used, then the block of pixel values is decoded by using decoded pixel values of a collocated block of a lower layer frame.

According to one embodiment, the method further comprises decoding a coded codeword signalling the coding mode among a plurality of coding modes, used for the block to decode.

According to one embodiment, the method further comprises determining the used coding mode for the block to decode, among a plurality of coding modes, one of the modes comprising encoding the block in the form of a flag indicating that for decoding the block, the decoded pixel values of a collocated block of a lower layer frame are used.

According to one embodiment, the method further comprises performing an interpolation on the decoded pixel values of said collocated block of the lower layer frame.

According to one embodiment, the method further comprises applying a post-filtering on the decoded pixel values of said collocated block of the lower layer frame.

According to another aspect of the invention, it is proposed a corresponding device for decoding a block of pixel values of an enhancement layer frame in a scalable decoder. The device comprises means operable, when a flag is received indicating that for decoding the block the decoded pixel values of a collocated block of a lower layer frame are used, to decode the block of pixel values by using decoded pixel values of a collocated block of a lower layer frame.

According to an embodiment, the device further comprises means for decoding a coded codeword signalling the coding mode among a plurality of coding modes, used for the block to decode.

According to an embodiment, the device further comprises means for determining from among a plurality of coding modes the coding mode used for the block to decode, one of the plurality of coding modes being a mode comprising encoding the block in the form of a flag indicating that, for decoding the block, the decoded pixel values of a collocated block of a lower layer frame are used.

According to an embodiment, the device further comprises means for performing an interpolation on the decoded pixel values of said collocated block of the lower layer frame.

According to an embodiment, the device further comprises means for applying a post-filtering on the decoded pixel values of said collocated block of the lower layer frame.

BRIEF DESCRIPTION OF THE DRAWINGS

Other particularities and advantages of the invention will also emerge from the following description, illustrated by the accompanying drawings, in which.

DETAILED DESCRIPTION OF EMBODIMENTS OF THE INVENTION

For the detailed description below, focus is made on the encoding of a UHD video as introduced above with reference to FIGS. 1 to 4. It is however to be recalled that the invention applies to the encoding of any image from which a probabilistic distribution of transformed block coefficients can be obtained (e.g. statistically). In particular, it applies to the encoding of an image without temporal prediction and possibly without spatial prediction.

Referring again to FIG. 3, a low resolution version of the initial image has been encoded into an encoded low resolution image, referred above as the base layer; and a residual enhancement image has been obtained by subtracting an interpolated decoded version of the encoded low resolution image from said initial image.

The encoding of the residual enhancement image is now described. As explained in more details below, it is proposed to determine an initial segmentation of the image to be encoded, then to change this segmentation in order to optimize an encoding cost and to use the optimizing segmentation for encoding.

Figure 14:
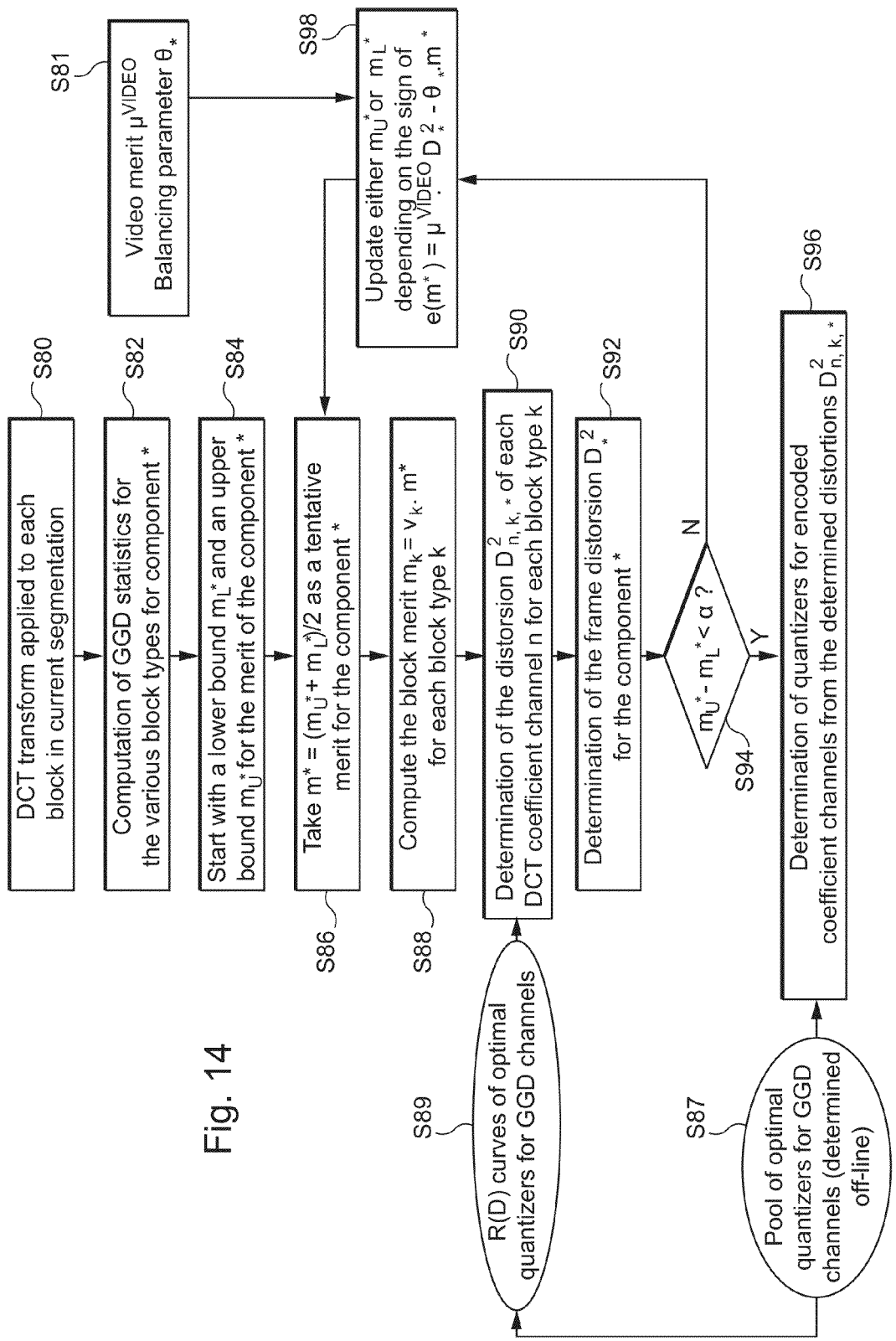
FIG. 14 shows a second possible embodiment of a process for determining optimal quantizers according to the teachings of the invention at the level of a video sequence.

The main steps of this optimized encoding process are now described one by one, before a presentation of the whole process in given with reference to FIG. 14.

Conventionally, the residual enhancement image is to be transformed, using for example a DCT transform, to obtain an image of transformed block coefficients. In the Figure, that image is referenced $X_{DCT}$, which comprises a plurality of DCT blocks, each comprising DCT coefficients.

As an example, the residual enhancement image may be divided by the initial segmentation just mentioned into blocks $B_k$, each having a particular block type. Several block types may be considered, owing in particular to various possible sizes for the block. Other parameters than size may be used to distinguish between block types.

In particular, as there may be a big disparity of activity (or energy) between blocks with the same size, a segmentation of a frame by using only block size is not fine enough to obtain an optimal performance of classification of parts of the frame. This is why it is proposed to add a label to the block size in order to distinguish various levels and/or characteristics of a block activity.

It is proposed for instance to use only square blocks, here blocks of dimensions 32×32, 16×16 and 8×8, and the following block types for luminance residual frames, each block type being defined by a size and a label (corresponding to an index of energy for instance, but possibly also to other parameters as explained below):

32×32 label 1;
32×32 label 2;
etc.
32×32 label $N_{32}$;
16×16 label 1 (e.g. bottom);
16×16 label 2 (e.g. low);
etc.;
16×16 label $N_{16}$;
8×8 label 1 (e.g. low);
8×8 label 2;
etc.;
8×8 label $N_8$ (e.g. high).

In addition, a further block type may be introduced for each block size, with a label "skip" meaning that the corresponding block of data is not encoded and that corresponding residual pixels, or equivalently DCT coefficients, are considered to have a null value (value zero). It is however proposed here not to use these types with skip-label in the initial segmentation, but to introduce them during the segmentation optimisation process, as described below.

There are thus $N_{32}+1$ block types of size 32×32, $N_{16}+1$ block types of size 16×16 and $N_8+1$ block types of size 8×8. The choice of the parameters $N_{32}$, $N_{16}$, $N_8$ depends on the residual frame content and, as a general rule, high quality coding requires more block types than low quality coding.

For the initial segmentation, the choice of the block size is performed here by computing the $L_2$ integral I of a morphological gradient (measuring residual activity, e.g. residual morphological activity) on each 32×32 block, before applying the DCT transform. (Such a morphological gradient corresponds to the difference between a dilatation and an erosion of the luminance residual frame, as explained for instance in "Image Analysis and Mathematical Morphology", Vol. 1, by Jean Serra, Academic Press, Feb. 11, 1984.) If the integral computed for a block is higher than a predetermined threshold, the concerned block is divided into four smaller, here 16×16-, blocks; this process is applied on each obtained 16×16 block to decide whether or not it is divided into 8×8 blocks (top-down algorithm).

Once the block size of a given block is decided, the block type of this block is determined based on the morphological integral computed for this block, for instance here by comparing the morphological integral I with thresholds defining three bands of residual activity (i.e. three indices of energy) for each possible size (as exemplified above: bottom, low or normal residual activity for 16×16-blocks and low, normal, high residual activity for 8×8-blocks).

It may be noted that the morphological gradient is used in the present example to measure the residual activity but that other measures of the residual activity may be used, instead or in combination, such as local energy or Laplace's operator.

In a possible embodiment, the decision to attribute a given label to a particular block (once its size is determined as above) may be based not only on the magnitude of the integral I, but also on the ratio of vertical activity vs. horizontal activity, e.g. thanks to the ratio $I_h/I_v$, where $I_h$ is the $L_2$ integral of the horizontal morphological gradient and $I_v$ is the $L_2$ integral of the vertical morphological gradient.

For instance, the concerned block will be attributed a label (i.e. a block type) depending on whether the ratio $I_h/I_v$ is below 0.5 (corresponding to a block with residual activity oriented in the vertical direction), between 0.5 and 2 (corresponding to a block with non-oriented residual activity) and above 2 (corresponding to a block with residual activity oriented in the horizontal direction).

It is proposed here that chrominance blocks each have a block type inferred from the block type of the corresponding luminance block in the frame. For instance chrominance block types can be inferred by dividing in each direction the size of luminance block types by a factor depending on the resolution ratio between the luminance and the chrominance.

In the present case where use is made of 4:2:0 videos, where chrominance (U and V) frames are down-sampled by a factor two both vertically and horizontally compared to the corresponding luminance frame, blocks in chrominance frames have a size (among 16×16, 8×8 and 4×4) and a label both inferred from the size and label of the corresponding block in the luminance frame.

In addition, it is proposed here as just explained to define the block type in function of its size and an index of the energy, also possibly considering orientation of the residual activity. Other characteristics can also be considered such as for example the encoding mode used for the collocated block of the base layer, referred below as to the "base coding mode". Typically, Intra blocks of the base layer do not behave the same way as Inter blocks, and blocks with a coded residual in the base layer do not behave the same way as blocks without such a residual (i.e. Skipped blocks).

Figure 11:
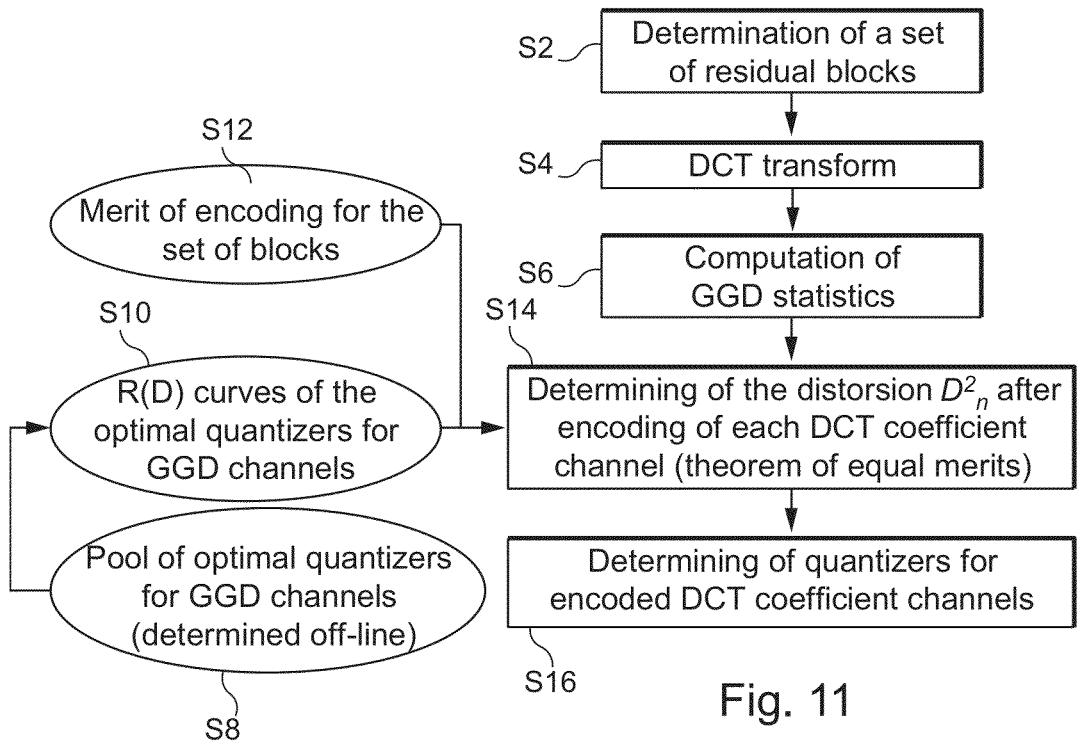
FIG. 11 shows an exemplary embodiment of a process for determining optimal quantizers according to the teachings of the invention at the block level.

FIG. 11 shows an exemplary process for determining optimal quantizers (based on a given segmentation, e.g. the initial segmentation or a modified segmentation during the optimising process) focusing on steps performed at the block level.

Once a segmentation is determined, including the definition of a block type associated to each block (steps S2), a DCT transform is then applied to each of the concerned blocks (step S4) in order to obtain a corresponding block of DCT coefficients.

Within a block, the DCT coefficients are associated with an index i (e.g. i=1 to 64), following an ordering used for successive handling when encoding, for example.

Blocks are grouped into macroblocks $MB_k$. A very common case for so-called 4:2:0 YUV video streams is a macroblock made of 4 blocks of luminance Y, 1 block of chrominance U and 1 block of chrominance V. Here too, other configurations may be considered.

To simplify the explanations, only the coding of the luminance component is described here with reference to FIG. 11. However, the same approach can be used for coding the chrominance components. In addition, it will be further explained with reference to FIGS. 13 and 14 how to process luminance and chrominance in relation with each other.

Starting from the image $X_{DCT}$, a probabilistic distribution P of each DCT coefficient is determined using a parametric probabilistic model at step S6. This is referenced 190 in FIG. 3.

Since, in the present example, the image $X_{DCT}$ is a residual image, i.e. information is about a noise residual, it is efficiently modelled by Generalized Gaussian Distributions (GGD) having a zero mean: $DCT(X) \approx GGD(\alpha, \beta)$, where $\alpha, \beta$ are two parameters to be determined and the GGD follows the following two-parameter distribution:

$$GGD(\alpha, \beta, x) := \frac{\beta}{2\alpha\Gamma(1/\beta)} \exp(-|x/\alpha|^\beta),$$

and where $\Gamma$ is the well-known Gamma function: $\Gamma(z) = \int_0^\infty t^{z-1} e^{-t} dt$.

The DCT coefficients cannot be all modelled by the same parameters and, practically, the two parameters $\alpha$, $\beta$ depend on:
- the video content. This means that the parameters must be computed for each image or for every group of n images for instance;
- the index i of the DCT coefficient within a DCT block $B_k$. Indeed, each DCT coefficient has its own behaviour. A DCT channel is thus defined for the DCT coefficients collocated (i.e. having the same index) within a plurality of DCT blocks (possibly all the blocks of the image). A DCT channel can therefore be identified by the corresponding coefficient index i. For illustrative purposes, if the residual enhancement image $X_{DCT}$ is divided into 8×8 pixel blocks, the modelling 190 has to determine the parameters of 64 DCT channels for each base coding mode.
- the block type defined above. The content of the image, and then the statistics of the DCT coefficients, may be strongly related to the block type because, as explained above, the block type is selected in function of the image content, for instance to use large blocks for parts of the image containing little information.

In addition, since the luminance component Y and the chrominance components U and V have dramatically different source contents, they must be encoded in different DCT channels. For example, if it is decided to encode the luminance component Y on one channel and to encode jointly the chrominance components UV on another channel, 64 channels are needed for the luminance of a block type of size 8×8 and 16 channels are needed for the joint UV chrominance (made of 4×4 blocks) in a case of a 4:2:0 video where the chrominance is down-sampled by a factor two in each direction compared to the luminance. Alternatively, one may choose to encode U and V separately and 64 channels are needed for Y, 16 for U and 16 for V.

At least 64 pairs of parameters for each block type may appear as a substantial amount of data to transmit to the decoder (see parameter bit-stream 21). However, experience proves that this is quite negligible compared to the volume of data needed to encode the residuals of Ultra High Definition (4 k2 k or more) videos. As a consequence, one may understand that such a technique is preferably implemented on large videos, rather than on very small videos because the parametric data would take too much volume in the encoded bitstream.

For sake of simplicity of explanation, a set of DCT blocks corresponding to the same block type are now considered.

To obtain the two parameters $\alpha_i$, $\beta_i$, defining the probabilistic distribution P, for a DCT channel i, the Generalized Gaussian Distribution model is fitted onto the DCT block coefficients of the DCT channel, i.e. the DCT coefficients collocated within the DCT blocks of the same block type. Since this fitting is based on the values of the DCT coefficients, the probabilistic distribution is a statistical distribution of the DCT coefficients within a considered channel i.

For example, the fitting may be simply and robustly obtained using the moment of order k of the absolute value of a GGD:

$$M_k^{\alpha_i, \beta_i} := E(|GGD(\alpha_i, \beta_i)|^k)_{(k \in R_+)}$$
$$= \int_{-\infty}^{\infty} |x|^k GGD(\alpha_i, \beta_i, x) dx$$
$$= \frac{\alpha_i^k \Gamma((1+k)/\beta_i)}{\Gamma(1/\beta_i)}.$$

Determining the moments of order 1 and of order 2 from the DCT coefficients of channel i makes it possible to directly obtain the value of parameter $\beta_i$:

$$\frac{M_2}{(M_1)^2} = \frac{\Gamma(1/\beta_i)\Gamma(3/\beta_i)}{\Gamma(2/\beta_i)^2}$$

The value of the parameter $\beta_i$ can thus be estimated by computing the above ratio of the two first and second moments, and then the inverse of the above function of $\beta_i$.

Practically, this inverse function may be tabulated in memory of the encoder instead of computing Gamma functions in real time, which is costly.

The second parameter $\alpha_i$ may then be determined from the first parameter $\beta_i$ and the second moment, using the equation: $M_2 = \sigma^2 = \alpha_i^2 \Gamma(3/\beta_i)/\Gamma(1/\beta_i)$.

The two parameters $\alpha_i$, $\beta_i$ being determined for the DCT coefficients i, the probabilistic distribution $P_i$ of each DCT coefficient i is defined by $$P_i(x) = GGD(\alpha_i, \beta_i, x) = \frac{\beta_i}{2\alpha_i\Gamma(1/\beta_i)} \exp(-|x/\alpha_i|^{\beta_i}).$$

Figure 1:
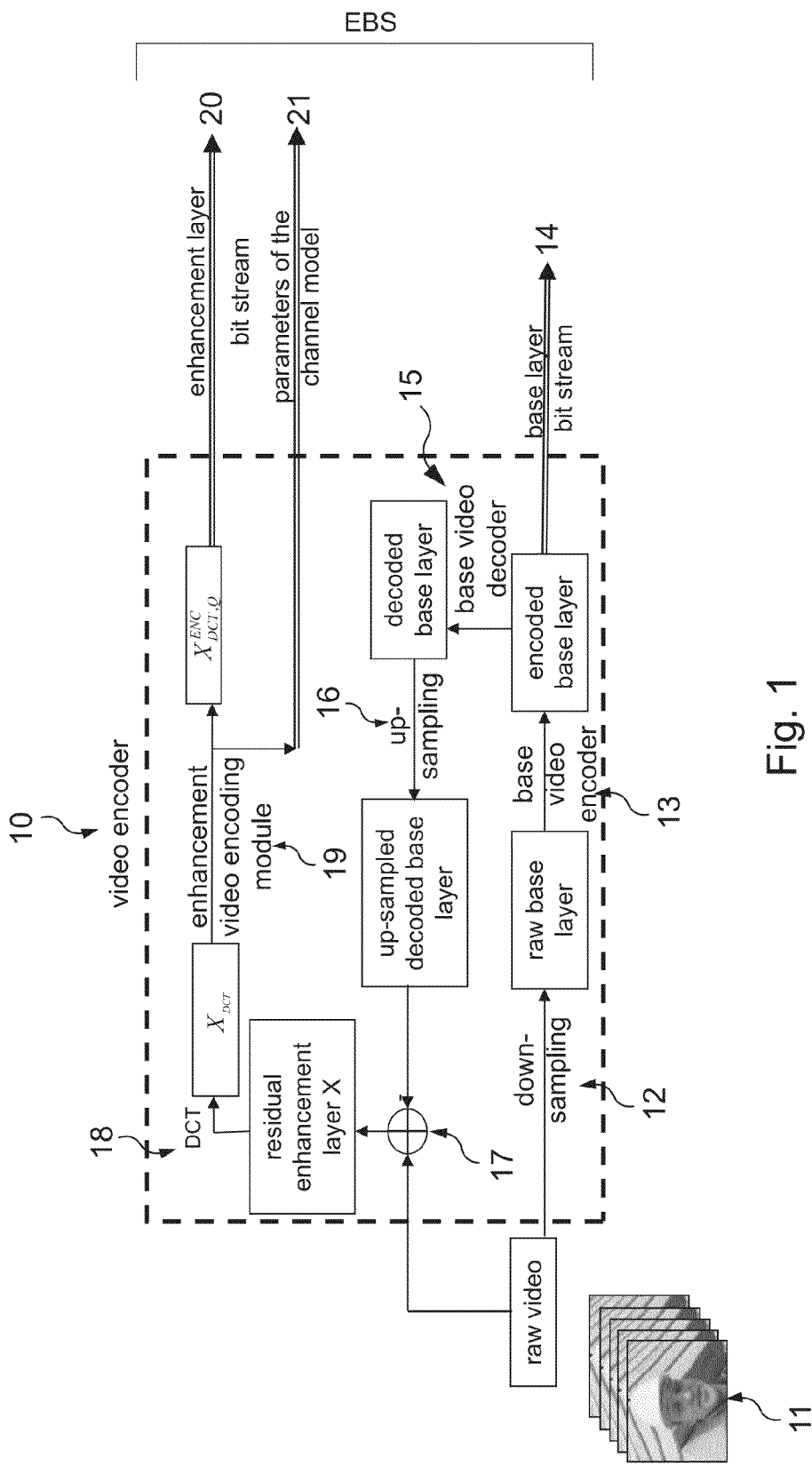
FIG. 1 schematically shows an encoder for a scalable codec.
Figure 2:
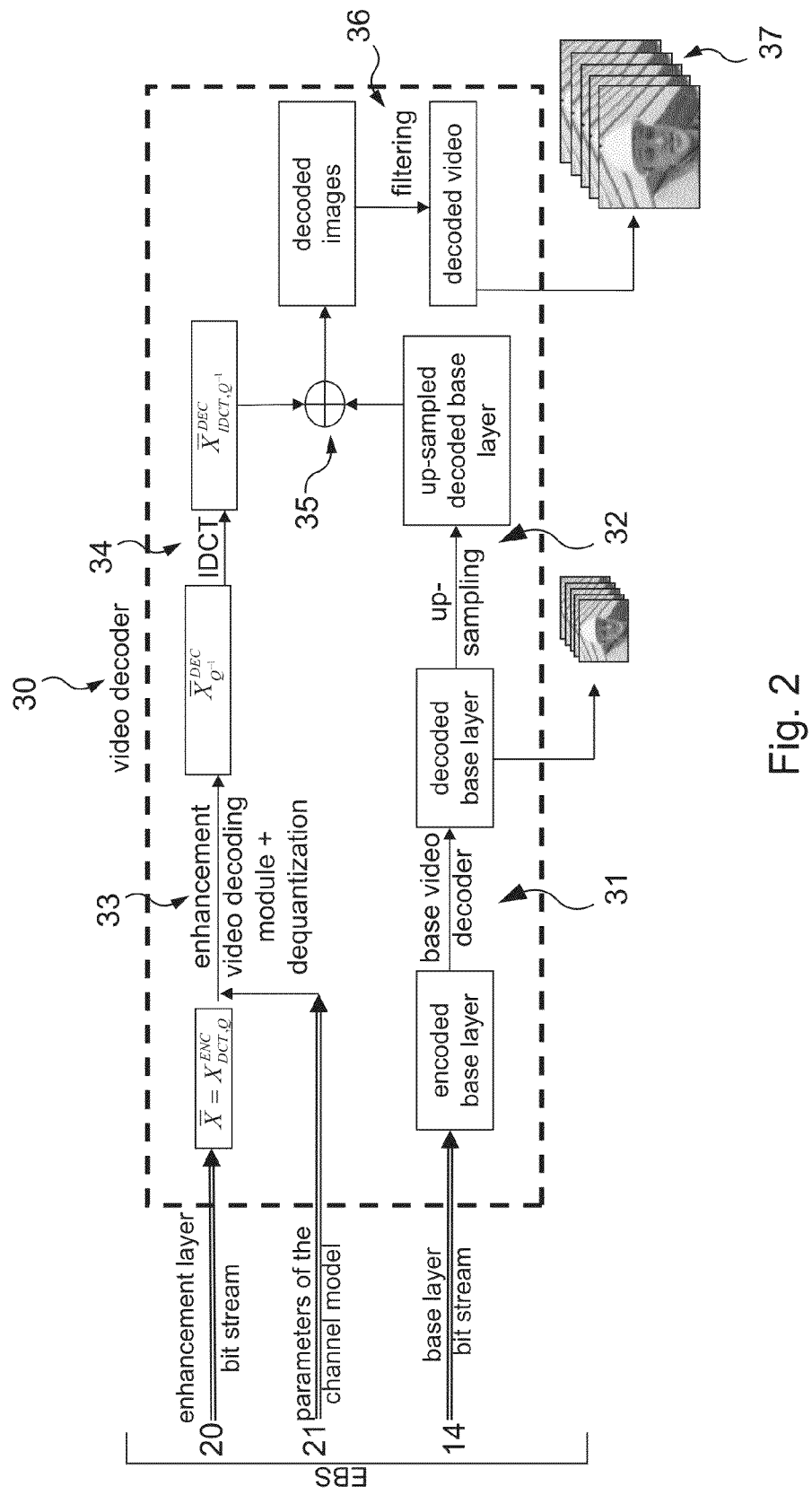
FIG. 2 schematically shows the corresponding decoder.
Figure 3:
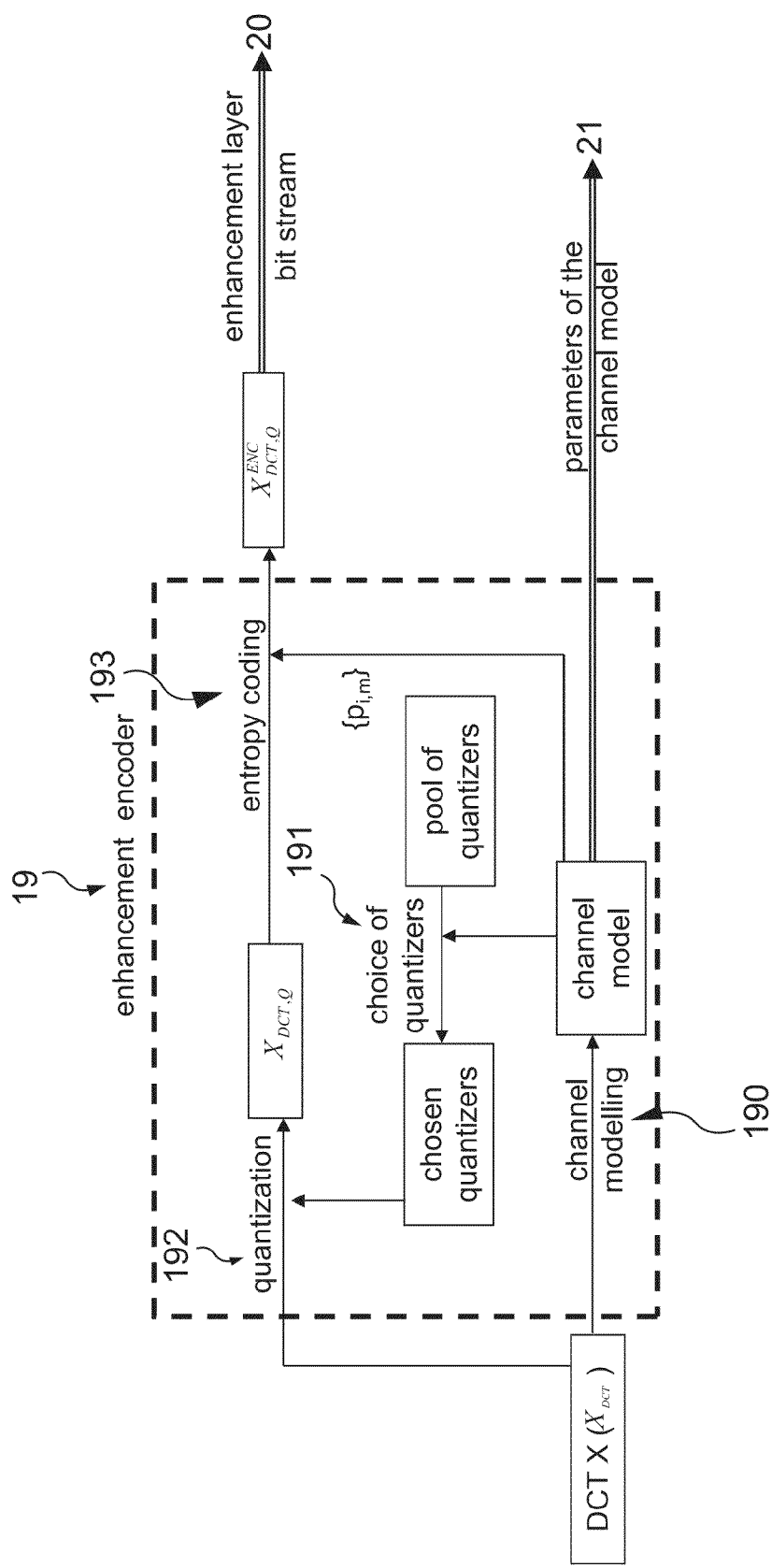
FIG. 3 schematically illustrates the enhancement video encoding module of the encoder of FIG. 1.
Figure 4:
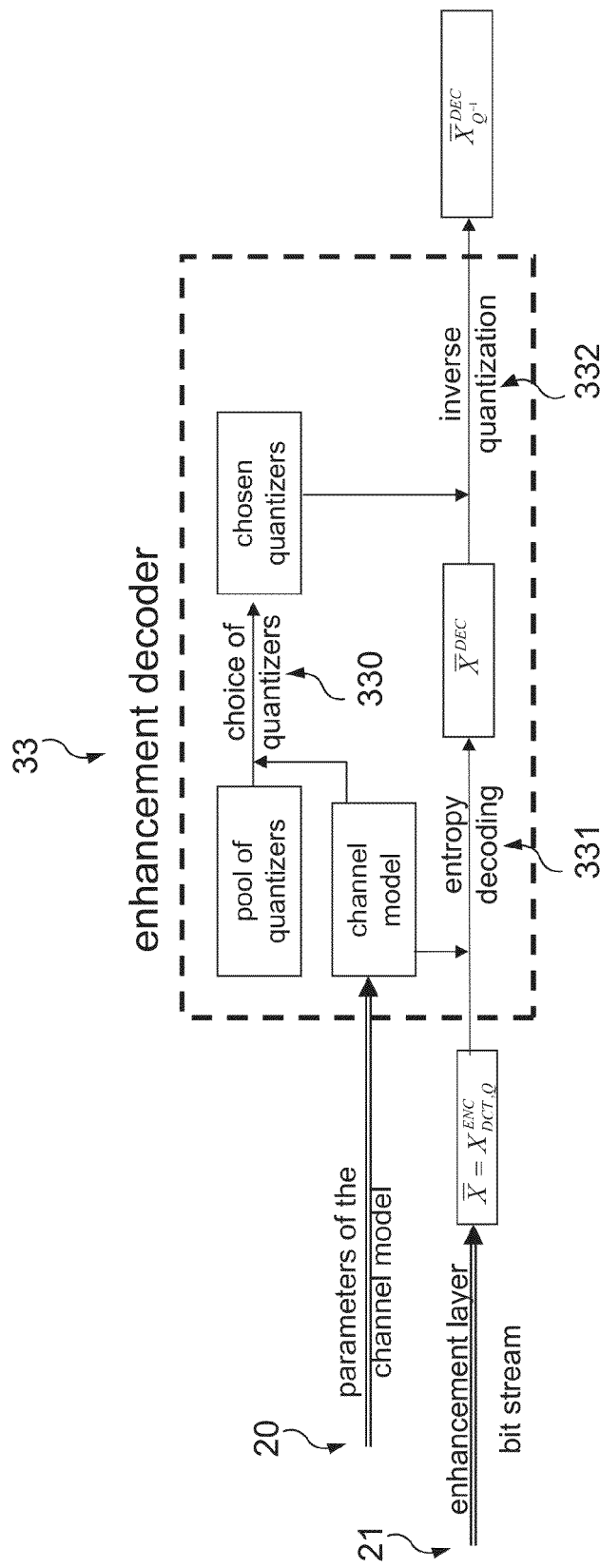
FIG. 4 schematically illustrates the enhancement video decoding module of the encoder of FIG. 2.

Referring to FIG. 3, a quantization 193 of the DCT coefficients is to be performed in order to obtain quantized symbols or values. As explained below, it is proposed here to first determine a quantizer per DCT channel so as to optimize a rate-distortion criterion.

Figure 5:
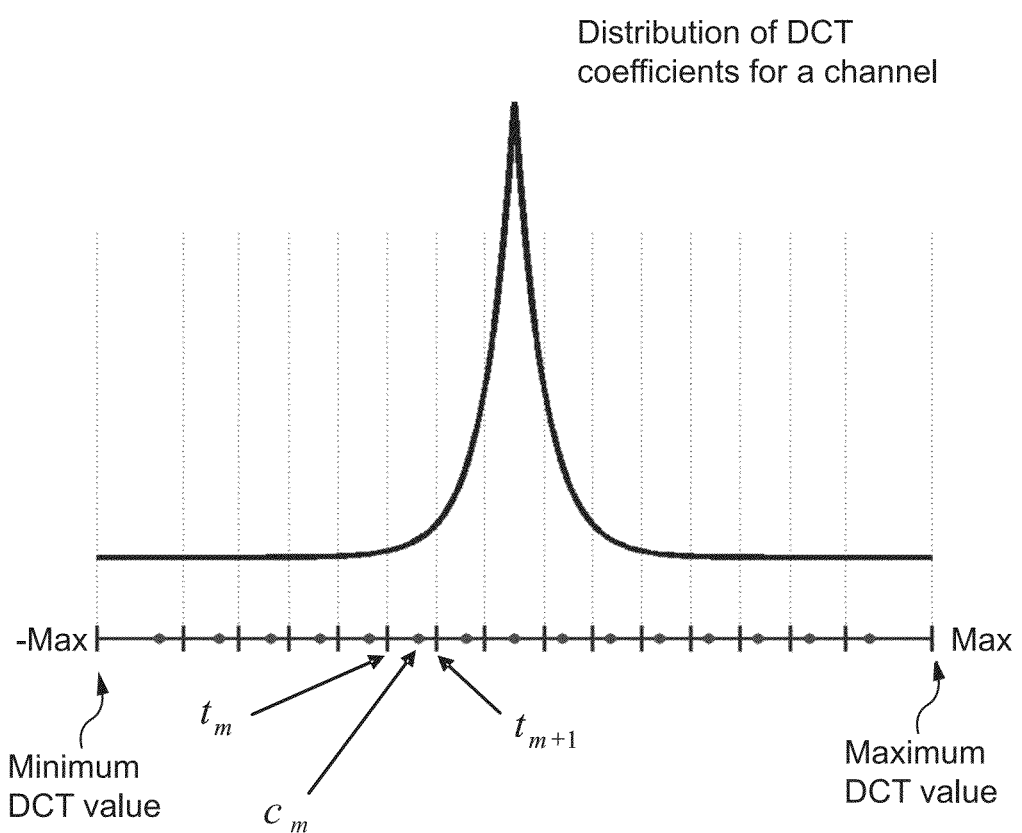
FIG. 5 illustrates an example of a quantizer based on Voronoi cells.

FIG. 5 illustrates an exemplary Voronoi cell based quantizer.

A quantizer is made of M Voronoi cells distributed along the values of the DCT coefficients. Each cell corresponds to an interval $[t_m, t_{m+1}]$, called quantum $Q_m$.

Each cell has a centroid $c_m$, as shown in the Figure.

The intervals are used for quantization: a DCT coefficient comprised in the interval $[t_m, t_{m+1}]$ is quantized to a symbol $a_m$ associated with that interval.

For their part, the centroids are used for de-quantization: a symbol $a_m$ associated with an interval is de-quantized into the centroid value $c_m$ of that interval.

The quality of a video or still image may be measured by the so-called Peak-Signal-to-Noise-Ratio or PSNR, which is dependent upon a measure of the L2-norm of the error of encoding in the pixel domain, i.e. the sum over the pixels of the squared difference between the original pixel value and the decoded pixel value. It may be recalled in this respect that the PSNR may be expressed in dB as:

$$10.\log_{10}\left(\frac{MAX^2}{MSE}\right),$$

where MAX is the maximal pixel value (in the spatial domain) and MSE is the mean squared error (i.e. the above sum divided by the number of pixels concerned).

However, as noted above, most of video codecs compress the data in the DCT-transformed domain in which the energy of the signal is much better compacted.

The direct link between the PSNR and the error on DCT coefficients is now explained.

Figure 6:
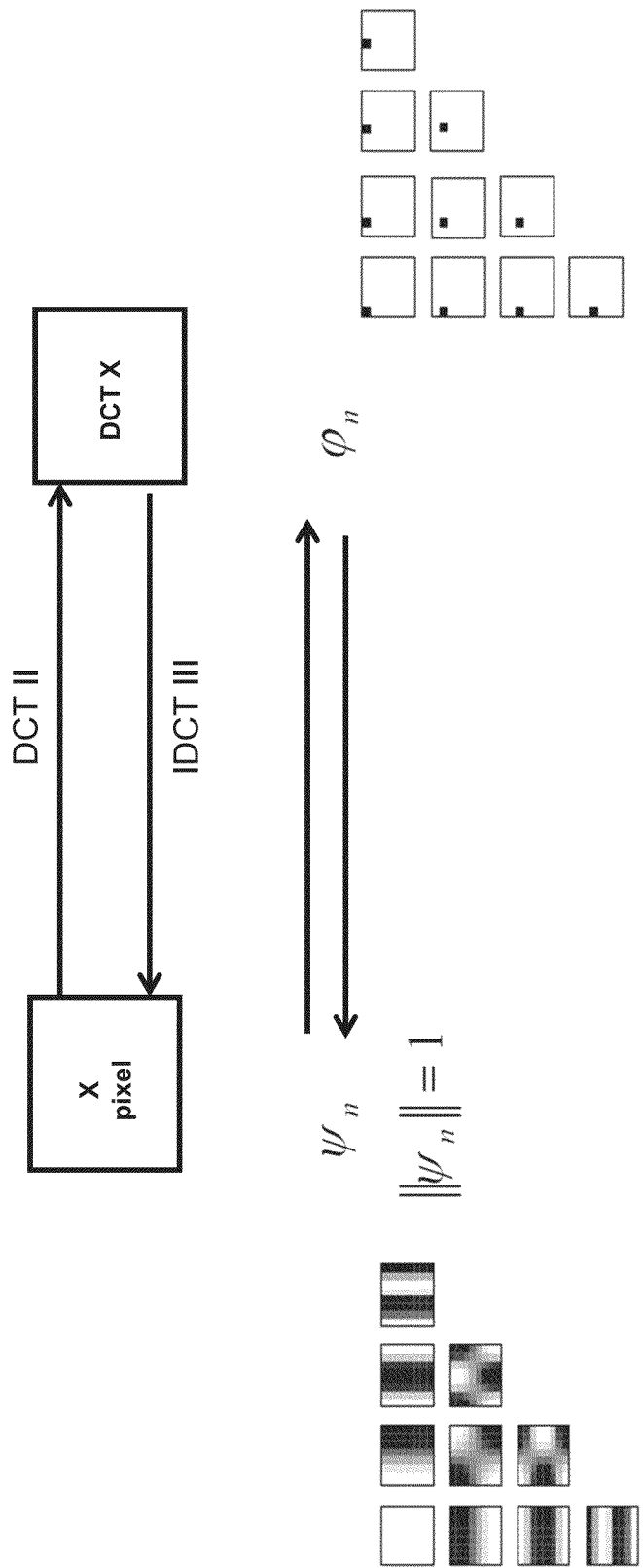
FIG. 6 shows the correspondence between data in the spatial domain (pixels) and data in the frequency domain.

For a residual block, we note $\psi_n$ its inverse DCT (or IDCT) pixel base in the pixel domain as shown on FIG. 6. If one uses the so-called IDCT III for the inverse transform, this base is orthonormal: $\|\psi_n\|=1$.

On the other hand, in the DCT domain, the unity coefficient values form a base $\phi_n$ which is orthogonal. One writes the DCT transform of the pixel block X as follows:

$$X_{DCT} = \sum_n d^n \varphi_n,$$

where $d^n$ is the value of the n-th DCT coefficient. A simple base change leads to the expression of the pixel block as a function of the DCT coefficient values:

$$X = IDCT(X_{DCT}) = IDCT \sum_n d^n \varphi_n = \sum_n d^n IDCT(\varphi_n) = \sum_n d^n \psi_n.$$

If the value of the de-quantized coefficient $d^n$ after decoding is denoted $d_Q^n$, one sees that (by linearity) the pixel error block is given by:

$$\varepsilon_X = \sum_n (d^n - d_Q^n) \psi_n$$

The mean $L_2$-norm error on all blocks, is thus:

$$E(\|\varepsilon_X\|_2^2) = E\left(\sum_n |d^n - d_Q^n|^2\right) = \sum_n E(|d^n - d_Q^n|^2) = \sum_n D_n^2$$

where $D_n^2$ is the mean quadratic error of quantization on the n-th DCT coefficient, or squared distortion for this type of coefficient. The distortion is thus a measure of the distance between the original coefficient (here the coefficient before quantization) and the decoded coefficient (here the dequantized coefficient).

It is thus proposed below to control the video quality by controlling the sum of the quadratic errors on the DCT coefficients. In particular, this control is preferable compared to the individual control of each of the DCT coefficient, which is a priori a sub-optimal control.

In the embodiment described here, it is proposed to determine (i.e. to select in step 191 of FIG. 3) a set of quantizers (to be used each for a corresponding DCT channel), the use of which results in a mean quadratic error having a target value $D_t^2$ while minimising the rate obtained. This corresponds to step S16 in FIG. 11.

In view of the above correspondence between PSNR and the mean quadratic error $D_n^2$ on DCT coefficients, these constraints can be written as follows:

$$\text{minimize } R = \sum_n R_n(D_n) \text{ s.t. } \sum_n D_n^2 = D_t^2 \quad (A)$$

where R is the total rate made of the sum of individual rates $R_n$ for each DCT coefficient. In case the quantization is made independently for each DCT coefficient, the rate $R_n$ depends only on the distortion $D_n$ of the associated n-th DCT coefficient.

It may be noted that the above minimization problem (A) may only be fulfilled by optimal quantizers which are solution of the problem $$\text{minimize } R_n(D_n) \text{ s.t. } E(|d^n - d_Q^n|^2) = D_n^2 \quad (B).$$

This statement is simply proven by the fact that, assuming a first quantizer would not be optimal following (B) but would fulfil (A), then a second quantizer with less rate but the same distortion can be constructed (or obtained). So, if one uses this second quantizer, the total rate R has been diminished without changing the total distortion $\Sigma_n D_n^2$; this is in contradiction with the first quantizer being a minimal solution of the problem (A).

As a consequence, the rate-distortion minimization problem (A) can be split into two consecutive sub-problems without losing the optimality of the solution:

first, determining optimal quantizers and their associated rate-distortion curves $R_n(D_n)$ following the problem (B), which will be done in the present case for GGD channels as explained below;

second, by using optimal quantizers, the problem (A) is changed into the problem (A_opt):

$$\text{minimize } R = \quad \text{(A\_opt)}$$

$$\sum_n R_n(D_n) \text{ s.t. } \sum_n D_n^2 = D_t^2 \text{ and } R_n(D_n) \text{ is optimal.}$$

Based on this analysis, it is proposed as further explained below:

to compute off-line (step S8 in FIG. 11) optimal quantizers adapted to possible probabilistic distributions of each DCT channel (thus resulting in the pool of quantizers of FIG. 3);

to select (step S16) one of these pre-computed optimal quantizers for each DCT channel (i.e. each type of DCT coefficient) such that using the set of selected quantizers results in a global distortion corresponding to the target distortion $D_t^2$ with a minimal rate (i.e. a set of quantizers which solves the problem A_opt).

It is now described a possible embodiment for the first step S8 of computing optimal quantizers for possible probabilistic distributions, here Generalised Gaussian Distributions.

It is proposed to change the previous complex formulation of problem (B) into the so-called Lagrange formulation of the problem: for a given parameter $\lambda > 0$, we determine the quantization in order to minimize a cost function such as $D^2 + \lambda R$. We thus get an optimal rate-distortion couple $(D_\lambda, R_\lambda)$. In case of a rate control (i.e. rate minimisation) for a given target distortion $\Delta_t$, the optimal parameter $\lambda > 0$ is determined by $$\lambda_{\Delta_t} = \arg\min_{\lambda, D_\lambda \leq \Delta_t} R_\lambda$$

(i.e. the value of $\lambda$ for which the rate is minimum while fulfilling the constraint on distortion) and the associated minimum rate is $$R_{\Delta_t} = R_{\lambda_{\Delta_t}}.$$

As a consequence, by solving the problem in its Lagrange formulation, for instance following the method proposed below, it is possible to plot a rate distortion curve associating a resulting minimum rate to each distortion value $(\Delta_t, R_{\Delta_t})$ which may be computed off-line as well as the associated quantization, i.e. quantizer, making it possible to obtain this rate-disortion pair.

It is precisely proposed here to formulate problem (B) into a continuum of problems (B_lambda) having the following Lagrange formulation minimize $D_n^2 + \lambda R_n(D_n) s.t. E(|x-d_m|^2) = D_n^2$ (B_lambda).

The well-known Chou-Lookabaugh-Gray algorithm is a good practical way to perform the required minimisation. It may be used with any distortion distance d; we describe here a simplified version of the algorithm for the $L^2$-distance. This is an iterative process from any given starting guessed quantization.

As noted above, this algorithm is performed here for each of a plurality of possible probabilistic distributions (in order to obtain the pre-computed optimal quantizers for the possible distributions to be encountered in practice), and for a plurality of possible numbers M of quanta. It is described below when applied for a given probabistic distribution P and a given number M of quanta.

In this respect, as the parameter alpha $\alpha$ (or equivalently the standard deviation $\sigma$ of the Generalized Gaussian Definition) can be moved out of the distortion parameter $D_n^2$ because it is a homothetic parameter, only optimal quantizers with unity standard deviation $\sigma=1$ need to be determined in the pool of quantizers.

Taking advantage of this remark, in the proposed embodiment, the GGD representing a given DCT channel will be normalized before quantization (i.e. homothetically transformed into a unity standard deviation GGD), and will be de-normalized after de-quantization. Of course, this is possible because the parameters (in particular here the parameter $\alpha$ or equivalently the standard deviation $\sigma$) of the concerned GGD model are sent to the decoder in the video bit-stream.

Before describing the algorithm itself, the following should be noted.

The position of the centroids $c_m$ is such that they minimize the distortion $\delta_m^2$ inside a quantum, in particular one must verify that $\partial_{c_m} \delta_m^2 = 0$ (as the derivative is zero at a minimum).

As the distortion $\delta_m$ of the quantization, on the quantum $Q_m$, is the mean error $E(d(x;c_m))$ for a given distortion function or distance d, the distortion on one quantum when using the $L^2$-distance is given by $\delta_m^2 = \int_{Q_m} |x-c_m|^2 P(x)dx$ and the nullification of the derivative thus gives: $c_m = \int_{Q_m} xP(x)dx/P_m$, where $P_m$ is the probability of x to be in the quantum $Q_m$ and is simply the following integral $P_m = \int_{Q_m} P(x)dx$.

Figure 7:
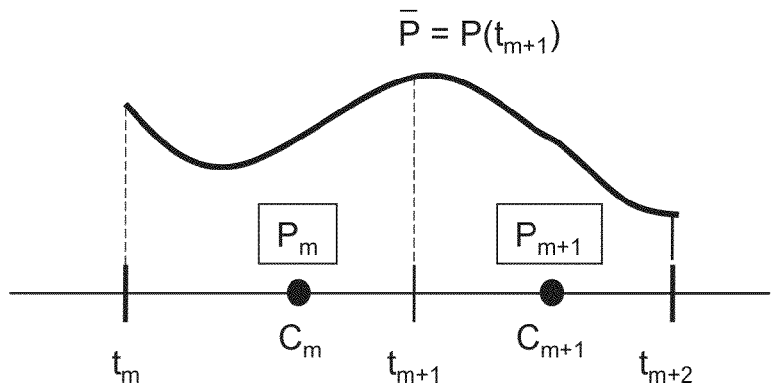
FIG. 7 illustrates an exemplary distribution over two quanta.

Turning now to minimisation of the cost function $C = D^2 + \lambda R$, and considering that the rate reaches the entropy of the quantized data:

$$R = -\sum_{m=1}^{M} P_m \log_2 P_m,$$

the nullification of the derivatives of the cost function for an optimal solution can be written as:

$0 = \partial_{t_{m+1}} C = \partial_{t_{m+1}} [\Delta_m^2 - \lambda P_m \ln P_m + \Delta_{m+1}^2 - \lambda P_{m+1} \ln P_{m+1}]$ Let us set $\overline{P} = P(t_{m+1})$ the value of the probability distribution at the point $t_{m+1}$. From simple variational considerations, see FIG. 7, we get $\partial_{t_{m+1}} P_m = \overline{P}$ and $\theta_{t_{m+1}} P_{m+1} = -\overline{P}$.

Then, a bit of calculation leads to $$\partial_{t_{m+1}} \Delta_m^2 = \partial_{t_{m+1}} \int_{t_m}^{t_{m+1}} |x - c_m|^2 P(x) dx$$
$$= \overline{P} |t_{m+1} - c_m|^2 + \int_{t_m}^{t_{m+1}} \partial_{t_{m+1}} |x - c_m|^2 P(x) dx$$
$$= \overline{P} |t_{m+1} - c_m|^2 - 2\partial_{t_{m+1}} c_m \int_{t_m}^{t_{m+1}} (x - c_m) P(x) dx$$
$$= \overline{P} |t_{m+1} - c_m|^2$$

as well as $\partial_{t_{m+1}} \Delta_{m+1}^2 = -\overline{P} |t_{m+1} - c_{m+1}|^2.$ As the derivative of the cost is now explicitly calculated, its cancellation gives:

$$0 = \overline{P} |t_{m+1} - d_m|^2 - \lambda \overline{P} \ln P_m -$$
$$\lambda P_m \frac{\overline{P}}{P_m} - \overline{P} |t_{m+1} - d_{m+1}|^2 + \lambda \overline{P} \ln P_{m+1} + \lambda P_m \frac{\overline{P}}{P_m},$$

which leads to a useful relation between the quantum boundaries $t_m, t_{m+1}$ and the centroids $$c_m: t_{m+1} = \frac{c_m + c_{m+1}}{2} - \lambda \frac{\ln P_{m+1} - \ln P_m}{2(c_{m+1} - c_m)}.$$

Thanks to these formulae, the Chou-Lookabaugh-Gray algorithm can be implemented by the following iterative process:

1. Start with arbitrary quanta $Q_m$ defined by a plurality of limits $t_m$
2. Compute the probabilities $P_m$ by the formula $P_m = \int_{Q_m} P(x)dx$
3. Compute the centroids $c_m$ by the formula $c_m = \int_{Q_m} xP(x)dx/P_m$
4. Compute the limits $t_m$ of new quanta by the formula $$t_{m+1} = \frac{c_m + c_{m+1}}{2} - \lambda \frac{\ln P_{m+1} - \ln P_m}{2(c_{m+1} - c_m)}$$

5. Compute the cost $C = D^2 + \lambda R$ by the formula $$C = \sum_{m=1}^{M} \Delta_m^2 - \lambda P_m \ln P_m$$

6. Loop to 2. until convergence of the cost C

When the cost C has converged, the current values of limits $t_m$ and centroids $c_m$ define a quantization, i.e. a quantizer, with M quanta, which solves the problem (B_lambda), i.e. minimises the cost function for a given value $\lambda$, and has an associated rate value $R_\lambda$ and an distortion value $D_\lambda$.

Such a process is implemented for many values of the Lagrange parameter $\lambda$ (for instance 100 values comprised between 0 and 50). It may be noted that for $\lambda$ equal to 0, there is no rate constraint, which corresponds to the so-called Lloyd quantizer.

Figure 8:
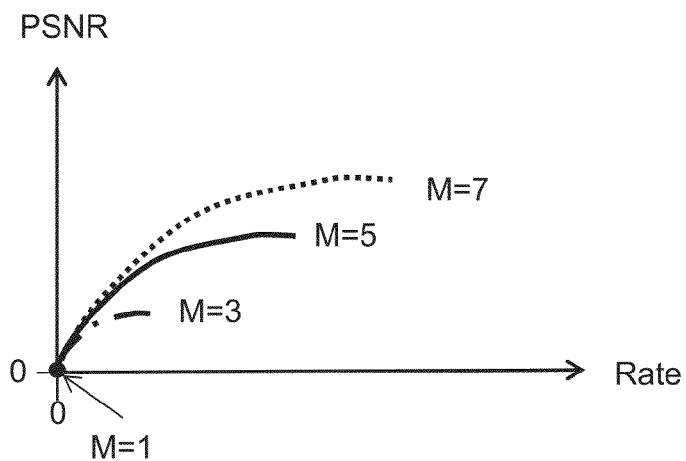
FIG. 8 shows exemplary rate-distortion curves, each curve corresponding to a specific number of quanta.

In order to obtain optimal quantizers for a given parameter $\beta$ of the corresponding GGD, the problems (B_lambda) are to be solved for various odd (by symmetry) values of the number M of quanta and for the many values of the parameter $\lambda$. A rate-distortion diagram for the optimal quantizers with varying M is thus obtained, as shown on FIG. 8.

Figure 9:
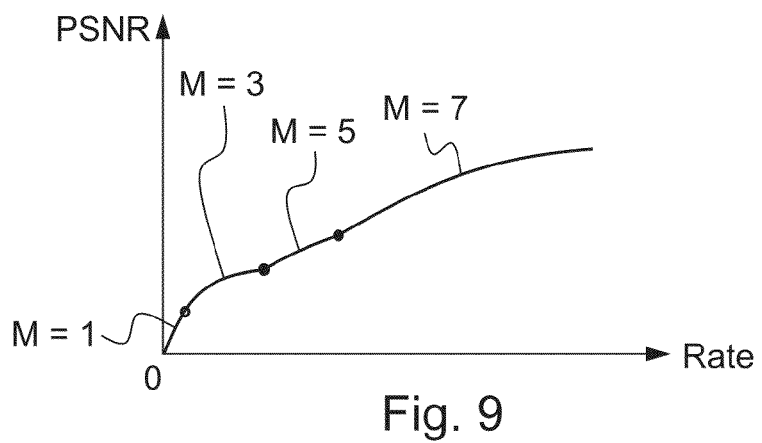
FIG. 9 shows the rate-distortion curve obtained by taking the upper envelope of the curves of FIG. 8.

It turns out that, for a given distortion, there is an optimal number M of needed quanta for the quantization associated to an optimal parameter $\lambda$. In brief, one may say that optimal quantizers of the general problem (B) are those associated to a point of the upper envelope of the rate-distortion curves making this diagram, each point being associated with a number of quanta (i.e. the number of quanta of the quantizer leading to this point of the rate-distortion curve). This upper envelope is illustrated on FIG. 9. At this stage, we have now lost the dependency on $\lambda$ of the optimal quantizers: for a given rate (or a given distortion) corresponds only one optimal quantizer whose number of quanta M is fixed.

Figure 10:
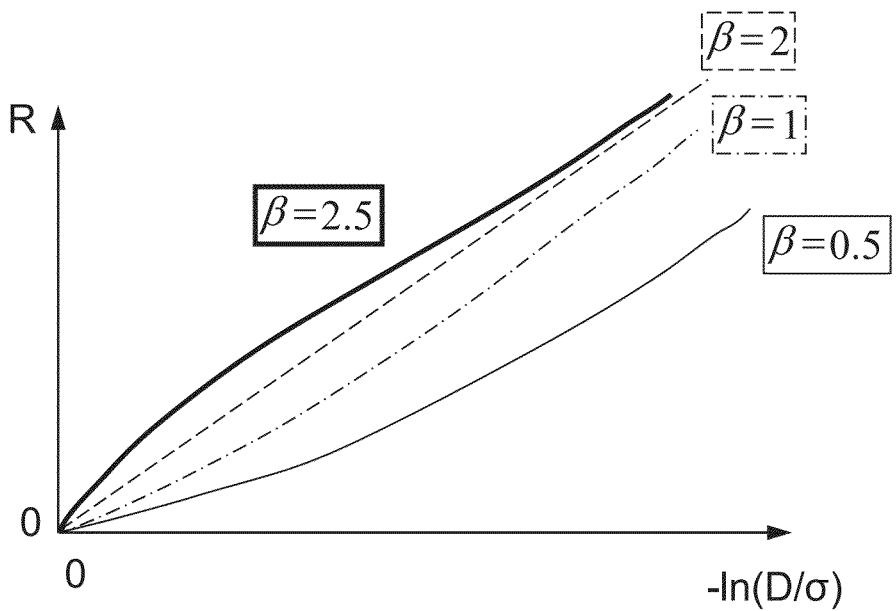
FIG. 10 depicts several rate-distortion curves obtained for various possible parameters of the DCT coefficient distribution.

Based on observations that the GGD modelling provides a value of $\beta$ almost always between 0.5 and 2 in practice, and that only a few discrete values are enough for the precision of encoding, it is proposed here to tabulate $\beta$ every 0.1 in the interval between 0.2 and 2.5. Considering these values of $\beta$ (i.e. here for each of the 24 values of $\beta$ taken in consideration between 0.2 and 2.5), rate-distortion curves, depending on $\beta$, are obtained (step S10) as shown on FIG. 10. It is of course possible to obtain according to the same process rate-distortion curves for a larger number of possible values of $\beta$.

Each curve may in practice be stored in the encoder in a table containing, for a plurality of points on the curve, the rate and distortion (coordinates) of the point concerned, as well as features defining the associated quantizer (here the number of quanta and the values of limits $t_m$ and centroids $c_m$ for the various quanta). For instance, a few hundreds of quantizers may be stored for each $\beta$ up to a maximum rate, e.g. of 5 bits per DCT coefficient, thus forming the pool of quantizers mentioned in FIG. 3. It may be noted that a maximum rate of 5 bits per coefficient in the enhancement layer makes it possible to obtain good quality in the decoded image. Generally speaking, it is proposed to use a maximum rate per DCT coefficient equal or less than 10 bits, for which value near lossless coding is provided.

Before turning to the selection of quantizers (step S16), for the various DCT channels and among these optimal quantizers stored in association with their corresponding rate and distortion when applied to the concerned distribution (GGD with a specific parameter $\beta$), it is proposed here to select which part of the DCT channels are to be encoded.

Based on the observation that the rate decreases monotonously as a function of the distortion induced by the quantizer, precisely in each case in the manner shown by the curves just mentioned, it is possible to write the relationship between rate and distortion as follows: $R_n = f_n(-\ln(D_n/\sigma_n))$, where $\sigma_n$ is the normalization factor of the DCT coefficient, i.e. the GGD model associated to the DCT coefficient has $\sigma_n$ for standard deviation, and where $f_n' \geq 0$ in view of the monotonicity just mentioned.

In particular, without encoding (equivalently zero rate) leads to a quadratic distortion of value $\sigma_n^2$ and we deduce that $0 = \theta_n(0)$.

Finally, one observes that the curves are convex for parameters $\beta$ lower than two: $\beta \leq 2 \Rightarrow f_n'' \geq 0$.

It is proposed here to consider the merit of encoding a DCT coefficient. More encoding basically results in more rate $R_n$ (in other words, the corresponding cost) and less distortion $D_n^2$ (in other words the resulting gain or advantage).

Thus, when dedicating a further bit to the encoding of the video (rate increase), it should be determined on which DCT coefficient this extra rate is the most efficient. In view of the analysis above, an estimation of the merit M of encoding may be obtained by computing the ratio of the benefit on distortion to the cost of encoding:

$$M_n := \left| \frac{\Delta D_n^2}{\Delta R_n} \right|.$$

Considering the distortion decreases by an amount $\epsilon$, then a first order development of distortion and rates gives $$(D-\epsilon)^2 = D^2 - 2\epsilon D + o(\epsilon)$$

and $$R(D - \varepsilon) = f_n(-\ln((D - \varepsilon)/\sigma))$$
$$= f_n(-\ln(D/\sigma) - \ln(1 - \varepsilon/D))$$
$$= f_n(-\ln(D/\sigma) + \varepsilon/D + o(\varepsilon))$$
$$= f_n(-\ln(D/\sigma)) + \varepsilon f'(-\ln(D/\sigma))/D.$$

As a consequence, the ratio of the first order variations provides an explicit formula for the merit of encoding:

$$M_n(D_n) = \frac{2D_n^2}{f_n'(-\ln(D_n/\sigma_n))}.$$

If the initial merit $M_n^0$ is defined as the merit of encoding at zero rate, i.e. before any encoding, this initial merit $M_n^0$ can thus be expressed as follows using the preceding formula:

$$M_n^0 := M_n(\sigma_n) = \frac{2\sigma_n^2}{f_n'(0)}$$

(because as noted above no encoding leads to a quadratic distortion of value $\sigma_n^2$).

It is thus possible, starting from the pre-computed and stored rate-distortion curves, to determine the function $f_n$ associated with a given DCT channel and to compute the initial merit $M_n^0$ of encoding the corresponding DCT coefficient (the value $f_n'(0)$ being determined by approximation thanks to the stored coordinates of rate-distortion curves).

It may further be noted that, for β lower than two (which is in practice almost always true), the convexity of the rate distortion curves teaches us that the merit is an increasing function of the distortion.

In particular, the initial merit is thus an upper bound of the merit: $M_n(D_n) \leq M_n^0$.

It will now be shown that, when satisfying the optimisation criteria defined above, all encoded DCT coefficients in the block have the same merit after encoding. Furthermore, this does not only apply to one block only, but as long as the various functions $f_n$ used in each DCT channel are the unchanged, i.e. in particular for all blocks in a given block type. Hence the common merit value for encoded DCT coefficients will now be referred to as the merit of the block type.

The above property of equal merit after encoding may be shown for instance using the Karush-Kuhn-Tucker (KKT) necessary conditions of optimality. In this goal, the quality constraint $$\sum_n D_n^2 = D_t^2$$

can be rewritten as h=0 with $$h(D_1, D_2, \ldots) := \sum_n D_n^2 - D_t^2.$$

The distortion of each DCT coefficient is upper bounded by the distortion without coding: $D_n \leq \sigma_n$, and the domain of definition of the problem is thus a multi-dimensional box $\Omega = \{(D_1, D_2, \ldots); D_n \leq \sigma_n\} = \{(D_1, D_2, \ldots); g_n \leq 0\}$, defined by the functions $g_n(D_n) := D_n - \sigma_n$.

Thus, the problem can be restated as follows:

minimize $R(D_1, D_2, \ldots)$ s.t. h=0, $g_n \leq 0$     (A_opt').

Such an optimization problem under inequality constrains can effectively be solved using so-called Karush-Kuhn-Tucker (KKT) necessary conditions of optimality.

In this goal, the relevant KKT function Λ is defined as follows:

$$\Lambda(D_1, D_2, \ldots, \lambda, \mu_1, \mu_2, \ldots) := R - \lambda h - \sum_n \mu_n g_n.$$

The KKT necessary conditions of minimization are
stationarity: dΛ=0,
equality: h=0,
inequality: $g_n \leq 0$,
dual feasibility: $\mu_n \leq 0$,
saturation: $\mu_n g_n = 0$.

It may be noted that the parameter λ in the KKT function above is unrelated to the parameter λ used above in the Lagrange formulation of the optimization problem meant to determine optimal quantizers.

If $g_n=0$, the n-th condition is said to be saturated. In the present case, it indicates that the n-th DCT coefficient is not encoded.

By using the specific formulation $R_n = f_n(-\ln(D_n/\sigma_n))$ of the rate depending on the distortion discussed above, the stationarity condition gives:

$$0 = \partial_{D_n}\Lambda = \partial_{D_n}R_n - \lambda\partial_{D_n}h - \mu_n\partial_{D_n}g_n = -f_n'/D_n - 2\lambda D_n - \mu_n,$$

i.e. $2\lambda D_n^2 = -\mu_n D_n - f_n'$.

By summing on n and taking benefit of the equality condition, this leads to $$2\lambda D_t^2 = -\sum_n \mu_n D_n - \sum_n f_n' \cdot (*)$$

In order to take into account the possible encoding of part of the coefficients only as proposed above, the various possible indices n are distributed into two subsets:
  the set $I^0 = \{n; \mu_n = 0\}$ of non-saturated DCT coefficients (i.e. of encoded DCT coefficients) for which we have $\mu_n D_n = 0$ and $D_n^2 = f_n'/2\lambda$, and
  the set $I^+ = \{n; \mu_n > 0\}$ of saturated DCT coefficients (i.e. of DCT coefficients not encoded) for which we have $\mu_n D_n = -f_n' 2\lambda\sigma_n^2$.

From (*), we deduce $$2\lambda D_t^2 = -\sum_{I^+} \mu_n D_n - \sum_n f_n' = \sum_{I^+} f_n' + 2\lambda\sum_{I^+}\sigma_n^2 - \sum_n f_n'$$

and by gathering the λ's $$2\lambda\left(D_t^2 - \sum_{I^+}\sigma_n^2\right) = \sum_{I^0} f_n'.$$

As a consequence, for a non-saturated coefficient ($n \in I^0$), i.e. a coefficient to be encoded, we obtain:

$$D_n^2 = \left(D_t^2 - \sum_{I^+}\sigma_n^2\right) f_n'(-\ln(D_n/\sigma_n)) \bigg/ \sum_{m \in I^0} f_m'(-\ln(D_m/\sigma_m)).$$

This formula for the distortion makes it possible to rewrite the above formula giving the merit $M_n(D_n)$ as follows for non-saturated coefficients:

$$M_n(D_n) = 2 \cdot \left( D_t^2 - \sum_{I^+} \sigma_n^2 \right) \bigg/ \sum_{m \in I^0} f_m'(-\ln(D_m/\sigma_m)).$$

Clearly, the right side of the equality does not depend on the DCT channel $n_{concerned}$. Thus, for a block type k, for any DCT channel n for which coefficients are encoded, the merit associated with said channel after encoding is the same: $M_n = m_k$.

Another proof of the property of common merit after encoding is the following: supposing that there are two encoded DCT coefficients with two different merits M1<M2, if an infinitesimal amount of rate from coefficient 1 is put on coefficient 2 (which is possible because coefficient 1 is one of the encoded coefficients and this does not change the total rate), the distortion gain on coefficient 2 would then be strictly bigger than the distortion loss on coefficient 1 (because M1<M2). This would thus provide a better distortion with the same rate, which is in contradiction with the optimality of the initial condition with two different merits.

As a conclusion, if the two coefficients 1 and 2 are encoded and if their respective merits M1 and M2 are such that M1<M2, then the solution is not optimal.

Furthermore, all non-coded coefficients have a merit smaller than the merit of the block type (i.e. the merit of coded coefficients after encoding).

In view of the property of equal merits of encoded coefficients when optimisation is satisfied, it is proposed here to encode only coefficients for which the initial encoding merit $$M_n^0 = \frac{2\sigma_n^2}{f_n'(0)}$$

is greater than a predetermined target block merit $m_k$.

For each coefficient to be encoded, a quantizer is selected to obtain the target block merit as the merit of the coefficient after encoding: first, the corresponding distortion, which is thus such that $$M_n(D_n) = \frac{2D_n^2}{f_n'(-\ln(D_n/\sigma_n))} = m_k,$$

can be found by dichotomy using stored rate-distortion curves (step S14); the quantizer associated (see steps S8 and S10 above) with the distortion found is then selected (step S16).

Figure 12:
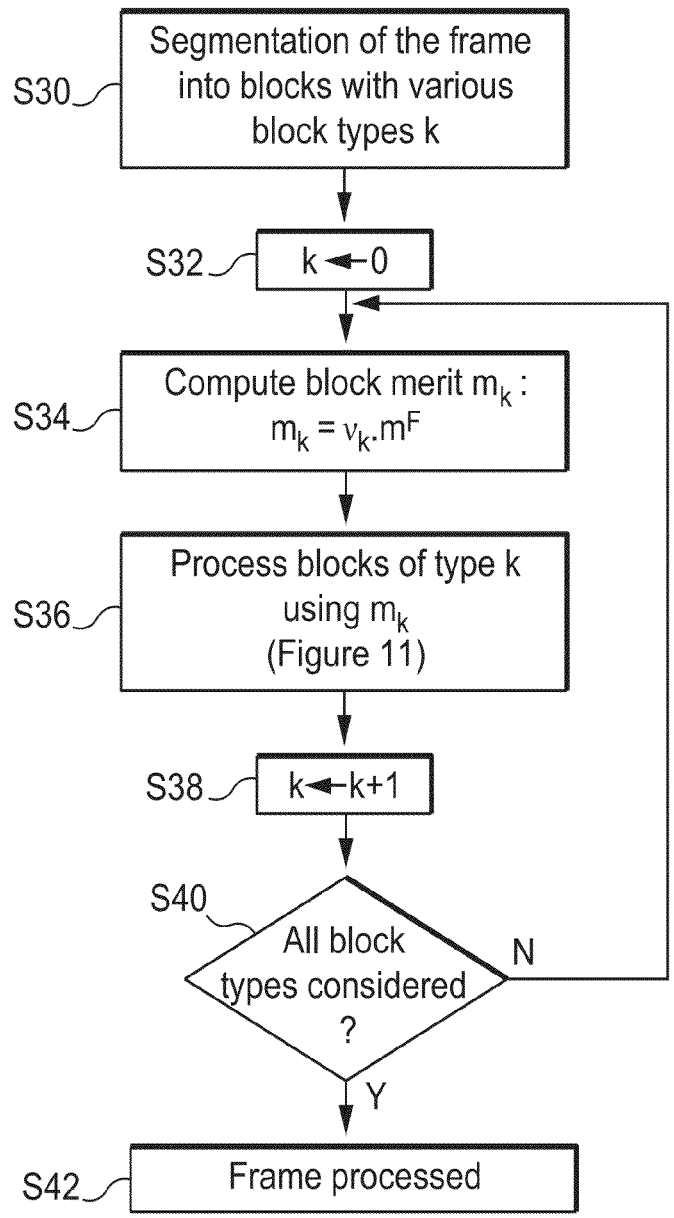
FIG. 12 shows an exemplary embodiment of a process for determining optimal quantizers according to the teachings of the invention at the frame level.

FIG. 12 shows the process for determining optimal quantizers implemented in the present example at the level of the frame, which includes in particular determining the target block merit for the various block types.

First, the frame is segmented at step S30 into a plurality of blocks each having a given block type k, for instance in accordance with the process described above based on residual activity, or as a result of a change in the segmentation as explained below.

A parameter k designating the block type currently considered is then initialised at step S32.

The target block merit $m_k$ for the block type k currently considered is the computed at step S34 based on a predetermined frame merit $m^F$ and on a number of blocks $v_k$ of the given block type per area unit, here according to the formula:

$$m_k = v_k \cdot m^F$$

For instance, one may choose the area unit as being the area of a 16×16 block, i.e. 256 pixels. In this case, $v_k = 1$ for block types of size 16×16, $v_k = 4$ for block types of size 8×8 etc. One also understands that the method is not limited to square blocks; for instance $v_k = 2$ for block types of size 16×8.

This type of computation makes it possible to obtain a balanced encoding between block types, i.e. here a common merit of encoding per pixel (equal to the frame merit $m^F$) for all block types.

This is because the variation of the pixel distortion $\Delta\delta_{P,k}^2$ for the block type k is the sum $$\sum_{coded\,n} \Delta D_{n,k}^2$$

of the distortion variations provided by the various encoded DCT coefficients, and can thus be rewritten as follows thanks to the (common) block merit:

$$\Delta\delta_{P,k}^2 = m_k \cdot \sum_{coded\,n} \Delta R_{n,k} = m_k \cdot \Delta R_k$$

(where $\Delta R_k$ is the rate variation for a block of type k). Thus, the merit of encoding per pixel is:

$$\frac{\Delta\delta_{P,k}^2}{\Delta U_k} = \frac{m_k \cdot \Delta R_k}{v_k \cdot \Delta R_k} = m^F$$

(where $U_k$ is the rate per area unit for the block type concerned) and has a common value over the various block types.

Optimal quantizers are then determined for the block type k currently considered by the process described above with reference to FIG. 11 using the data in blocks having the current block type k when computing parameters of the probabilistic distribution (GGD statistics) and using the block merit $m_k$ just determined as the target block merit in step S14 of FIG. 11.

The next block type is then considered by incrementing k (step S38), checking whether all block types have been considered (step S40) and looping to step S34 if all block types have not been considered.

If all block types have been considered, the whole frame has been processed (step S42), which ends the encoding process at the frame level presented here.

Figure 13:
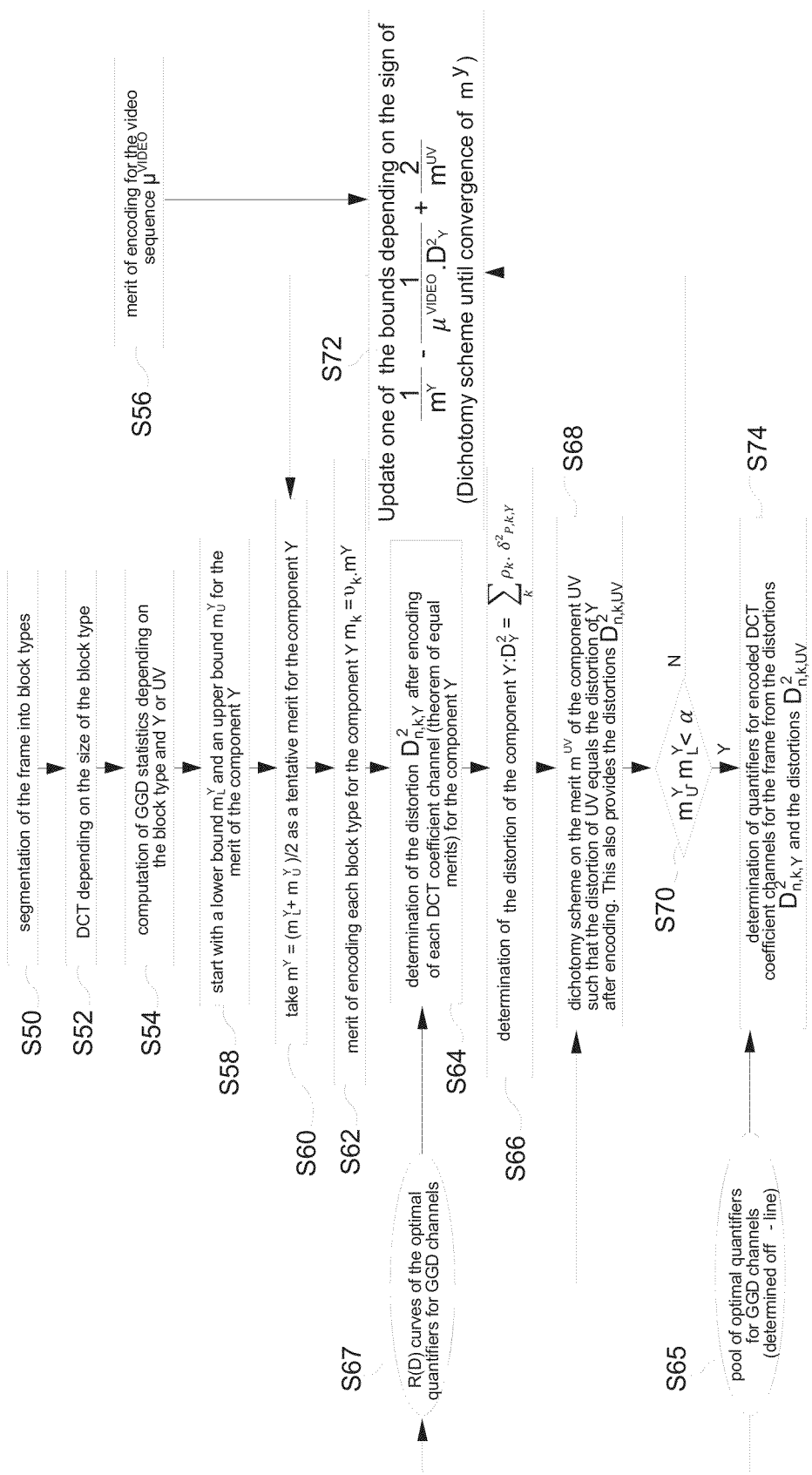
FIG. 13 shows a first possible embodiment of a process for determining optimal quantizers according to the teachings of the invention at the level of a video sequence.

FIG. 13 shows a process for determining optimal quantizers according to a first possible embodiment, which includes in particular determining the frame merit for luminance frames Y as well as for chrominance frames U,V of the video sequence.

The process shown in FIG. 13 applies to a specific frame and is to be applied at each iteration of the optimisation process described below with reference to FIG. 15.

The frame is segmented into blocks each having a block type at step S50; in a similar manner as was explained above for step S30, this can result from the initial segmentation or from a segmentation obtained during the optimization process. As mentioned above, the initial segmentation is determined based on the residual activity of the luminance frame Y and is also applied to the chrominance frames U,V.

A DCT transform is then applied (step S52) to each block thus defined. The DCT transform is adapted to the type of the block concerned, in particular to its size.

Parameters representative of the statistical distribution of coefficients (here $\alpha_i$, $\beta_i$ as explained above) are then computed (step S54) both for luminance frames and for chrominance frames, in each case for each block type, each time for the various coefficient types.

A loop is then entered (at step S58 described below) to determine by dichotomy a luminance frame merit $m^Y$ and a chrominance frame merit $m^{UV}$ linked by the following relationship:

$$\frac{1}{\mu^{VIDEO} \cdot D_Y^2} - \frac{2}{m^{UV}} = \frac{1}{m^Y},$$

where $\mu^{VIDEO}$ is a selectable video merit obtained for instance based on user selection of a quality level at step S56 and $D_Y^2$ is the frame distortion for the luminance frame after encoding and decoding.

Each of the determined luminance frame merit $m^Y$ and chrominance frame merit $m^{UV}$ may then be used as the frame merit $m^F$ in a process similar to the process described above with reference to FIG. 12, as further explained below.

The relationship given above makes it possible to adjust (to the value $\mu^{VIDEO}$) the local video merit defined as the ratio between the variation of the PSNR (already defined above) of the luminance $\Delta PSNR_Y$ and the corresponding variation of the total rate $\Delta R_{YUV}$ (including not only luminance but also chrominance frames). This ratio is generally considered when measuring the efficiency of a coding method.

This relationship is also based on the following choices made in the present embodiment:
  the quality of luminance frames is the same as the quality of chrominance frames: $D_Y^2 = D_{UV}^2 = (D_U^2 + D_V^2)/2$;
  the merit of U chrominance frames is the same as the merit of V chrominance frames: $m^U = m^V = m^{UV}$.

As explained above, the merit $m^F$ of encoding per pixel is the same whatever the block in a frame and the relationship between distortion and rate thus remains valid at the frame level (by summing over the frame the distortions of the one hand and the rates on the other hand, each corresponding distortion and rate defining a constant ratio $m^F$): $\Delta D_Y^2 = m^Y \cdot \Delta R_Y$, $\Delta D_U^2 = m^{UV} \cdot \Delta R_U$ and $\Delta D_V^2 = m^{UV} \cdot \Delta R_V$, where $\Delta R_Y$, $\Delta R_U$ and $\Delta R_V$ are the rate variations respectively for the luminance frame, the U chrominance frame and the V chrominance frame.

Thus, $$\Delta R_{YUV} = \frac{\Delta D_Y^2}{m^Y} + \frac{\Delta D_U^2}{m^{UV}} + \frac{\Delta D_V^2}{m^{UV}} = \Delta D_Y^2 \cdot \left(\frac{1}{m^Y} + \frac{2}{m^{UV}}\right).$$

As the PSNR is the logarithm of the distortion $D_Y^2$, its variation $\Delta PSNR_Y$ can be written as follows at the first order:

$$\Delta PSNR_Y = \frac{\Delta D_Y^2}{D_Y^2},$$

and the video merit can thus be restated as follows based on the above asumptions and remarks:

$$\frac{\Delta PSNR_Y}{\Delta R_{YUV}} = \frac{\Delta PSNR_Y}{\Delta R_Y} \frac{\Delta R_Y}{\Delta R_{YUV}} =$$

$$\frac{\Delta D_Y^2 \cdot m^Y}{D_Y^2 \cdot \Delta D_Y^2} \frac{\Delta D_Y^2}{m^Y \cdot \Delta D_Y^2 \left(\frac{1}{m^Y} + \frac{2}{m^{UV}}\right)} = \frac{1}{D_Y^2 \cdot \left(\frac{1}{m^Y} + \frac{2}{m^{UV}}\right)}.$$

This ratio is equal to the chosen value $\mu^{VIDEO}$ when the above relationship $$\left(\frac{1}{\mu^{VIDEO} \cdot D_Y^2} - \frac{2}{m^{UV}} = \frac{1}{m^Y}\right)$$

is satisfied.

Going back to the loop process implemented to determine the luminance frame merit $m^Y$ and the chrominance frame merit $m^{UV}$ as mentioned above, a lower bound $m_L^Y$ and an upper bound $m_U^Y$ for the luminance frame merit are initialized at step S58 at predetermined values. The lower bound $m_L^Y$ and the upper bound $m_U^Y$ define an interval, which includes the luminance frame merit and which will be reduced in size (divided by two) at each step of the dichotomy process. At initialization step S58, the lower bound $m_L^Y$ may be chosen as strictly positive but small, corresponding to a nearly lossless encoding, while the upper bound $m_U^Y$ is chosen for instance greater than all initial encoding merits (over all DOT channels and all block types).

A temporary luminance frame merit $m^Y$ is computed (step S60) as equal to $$\frac{m_L^Y + m_U^Y}{2}$$

(i.e. in the middle of the interval).

A block merit is then computed at step S62 for each of the various block types, as explained above with reference to FIG. 12 (see in particular step S34) according to the formula: $m_k = v_k \cdot m^Y$. Block merits are computed based on the temporary luminance frame merit defined above. The next steps are thus based on this temporary value which is thus a tentative value for the luminance frame merit.

For each block type k in the luminance frame, the distortions $D_{n,k,Y}^2$ after encoding of the various DOT channels n are then determined at step S64 in accordance with what was described with reference to FIG. 11, in particular step S14, based on the block merit $m_k$ just computed and on optimal rate-distortion curves determined beforehand at step S67, in the same manner as in step S10 of FIG. 11.

The frame distortion for the luminance frame $D_Y^2$ can then be determined at step S66 by summing over the block types thanks to the formula:

$$D_Y^2 = \sum_k \rho_k \cdot \delta_{P,k,Y}^2 = \sum_k \rho_k \cdot \left(\sum_n D_{n,k,Y}^2\right),$$

where $\rho_k$ is the density of a block type in the frame, i.e. the ratio between the total area for blocks having the concerned block type k and the total area of the frame.

It is then sought, for instance by dichotomy at step S68 and also based on optimal rate-distortion curves predetermined at step S67, a temporary chrominance frame merit $m^{UV}$ such that the distortions after encoding $D_{n,k,U}^2$, $D_{n,k,V}^2$, obtained by implementing a process according to FIG. 12 using $m^{UV}$ as the frame merit, result in chrominance frame distortions $D_U^2$, $D_V^2$, satisfying $D_Y^2=(D_U^2+D_V^2)/2$.

It may be noted in this respect that the relationship between distortions of the DCT channels and the frame distortion, given above for the luminance frame, is also valid for each of the chrominance frames U,V.

It is then checked at step S70 whether the interval defined by the lower bound $m_L^Y$ and the upper bound $m_U^Y$ have reached a predetermined required accuracy α, i.e. whether $m_U^Y - m_L^Y < \alpha$.

If this is not the case, the dichotomy process will be continued by selecting one of the first half of the interval and the second half of the interval as the new interval to be considered, depending on the sign of $$\frac{1}{m^Y} - \frac{1}{\mu^{VIDEO} \cdot D_Y^2} + \frac{2}{m^{UV}},$$

which will thus converge towards zero such that the relationship defined above is satisfied. The lower bound $m_L^Y$ and the upper bound $m_U^Y$ are adapted consistently with the selected interval (step S72) and the process loops at step S60.

If the required accuracy is reached, the process continues at step S74 where quantizers are selected in a pool of quantizers predetermined at step S65 and associated with points of the optimal rate-distortion curves already used (see explanations relating to step S8 in FIG. 11), based on the distortions values $D_{n,k,Y}^2, D_{n,K,U}^2, D_{n,k,V}^2$ obtained during the last iteration of the dichotomy process (steps S64 and S68 described above).

FIG. 14 shows a process for determining optimal quantizers according to a second possible embodiment, which includes in particular determining the frame merit for luminance component Y as well as for each of chrominance components U,V for each frame of the video sequence.

It is proposed in the present embodiment to consider the following video quality function:

$$Q(R_Y, R_U, R_V) = PSNR_Y + \theta_U \cdot PSNR_U + \theta_V \cdot PSNR_V,$$

where R* is the rate for the component * of a frame, PSNR* is the PSNR for the component * of a frame, and $\theta_U$, $\theta_V$ are balancing parameters provided by the user in order to select the acceptable degree of distortion in the concerned chrominance component (U or V) relative to the degree of distortion in the luminance component.

In order to unify the explanations in the various components, use is made below of $\theta_Y=1$ and the video quality function considered here can thus be rewritten as:

$$Q(R_Y, R_U, R_V) = \theta_Y \cdot PSNR_Y + \theta_U \cdot PSNR_U + \theta_V \cdot PSNR_V.$$

As already noted, the PSNR is the logarithm of the frame distortion: $PSNR^* = \ln(D^{*2})$ ($D^{*2}$ being the frame distortion for the frame of the component *) and it can thus be written at the first order that $$\Delta PSNR_* = \frac{\Delta D_*^2}{D_*^2}.$$

As the merit $m^F$ of encoding per pixel is the same whatever the block in a frame, the relationship between distortion and rate thus remains valid at the frame level (by summing over the frame the distortions of the one hand and the rates on the other hand, each corresponding distortion and rate defining a constant ratio $m^F$) and it can be written that: $\Delta D_*^2 = m^* \cdot \Delta R_*$.

The variation of the video quality Q defined above depending on the attribution of the rate R* to a given component * can thus be estimated to:

$$\frac{\partial Q}{\partial R_*} = \frac{\theta_* m^*}{D_*^2}.$$

It is proposed in the process below to encode the residual data such that no component is favoured compared to another one (taking into account the video quality function Q), i.e. such that $$\frac{\partial Q}{\partial R_Y} = \frac{\partial Q}{\partial R_U} = \frac{\partial Q}{\partial R_V}.$$

As described below, the encoding process will thus be designed to obtain a value $\mu^{VIDEO}$ for this common merit, which value defines the video merit and is selectable by the user. In view of the above formulation for $$\frac{\partial Q}{\partial R_*},$$

the process below is thus designed such that:

$$\mu^{VIDEO} = \frac{\theta_Y \cdot m^Y}{D_Y^2} = \frac{\theta_U \cdot m^U}{D_U^2} = \frac{\theta_V \cdot m^V}{D_V^2},$$

i.e. to obtain, for each of the three components, a frame merit m* such that the function $e(m^*) = \mu^{VIDEO} \cdot D_*^2(m^*)^* - \theta_* \cdot m^*$ is null (the distortion at the frame level $D_*^2$ being here noted $D_*^2(m^*)$ in order to explicit the fact that it depends on the frame merit m*).

The process shown in FIG. 14 applies to a particular component, denoted * below, of a specific frame and is to be applied to each of the three components Y, U, V at each iteration of the optimisation process described below with reference to FIG. 15.

The process of FIG. 14 applies to a frame which is segmented into blocks according to a current segmentation (which can be either an initial segmentation as defined above or a segmentation produced at any step by the optimization process described below with reference to FIG. 15).

A DCT transform is applied (step S80) to each block thus defined in the concerned frame.

Parameters representative of the statistical distribution of coefficients (here $\alpha_i$, $\beta_i$ as explained above) are then computed (step S82) for each block type, each time for the various coefficient types. As noted above, this applies to a given component * only.

Before entering a loop implemented to determine the frame merit m*, a lower bound $m_L^*$ and an upper bound $m^U*$ for the frame merit are initialized at step S84 at predetermined values. The lower bound $m_L^*$ and the upper bound $m_U^*$ define an interval, which includes the sought frame merit and which will be reduced in size (divided by two) at each step of the dichotomy process. At initialization step S84, the lower bound $m_L^*$ may be chosen as strictly positive but small, corresponding to a nearly lossless encoding, while the upper bound $m_U^*$ is chosen for instance greater than all initial encoding merits (over all DCT channels and all block types).

A temporary luminance frame merit m* is computed (step S86) as equal to $$\frac{m_L^* + m_U^*}{2}$$

(i.e. in the middle of the interval).

A block merit is then computed at step S88 for each of the various block types, as explained above with reference to FIG. 12 (see in particular step S34) according to the formula: $m_k = v_k \cdot m^*$. Block merits are computed based on the temporary frame merit defined above. The next steps are thus based on this temporary value which is thus a tentative value for the frame merit for the concerned component *.

For each block type k in the frame, the distortions $D_{n,k,*}^2$ after encoding of the various DCT channels n are then determined at step S88 in accordance with what was described with reference to FIG. 11, in particular step S14, based on the block merit $m_k$ just computed and on optimal rate-distortion curves determined beforehand at step S89, in the same manner as in step S10 of FIG. 11.

The frame distortion for the luminance frame $D_*^2$ can then be determined at step S92 by summing over the block types thanks to the formula:

$$D_*^2 = \sum_k \rho_k \cdot \delta_{P,k,*}^2 = \sum_k \rho_k \cdot \left(\sum_n D_{n,k,*}^2\right),$$

where $\rho_k$ is the density of a block type in the frame, i.e. the ratio between the total area for blocks having the concerned block type k and the total area of the frame.

It is then checked at step S94 whether the interval defined by the lower bound $m_L^*$ and the upper bound $m_U^*$ have reached a predetermined required accuracy α, i.e. whether $m_U^* - m_L^* < \alpha$.

If this is not the case, the dichotomy process will be continued by selecting one of the first half of the interval and the second half of the interval as the new interval to be considered, depending on the sign of e(m*), i.e. here the sign of $\mu^{VIDEO} \cdot D_*^2(m^*) - \theta_* \cdot m^*$, which will thus converge towards zero as required to fulfill the criterion defined above. It may be noted that the selected video merit $\mu^{VIDEO}$ (see selection step S81) and, in the case of chrominance frames U, V, the selected balancing parameter $\theta_*$ (i.e. $\theta_U$ or $\theta_V$) are introduced at this stage in the process for determining the frame merit m*.

The lower bound $m_L^*$ and the upper bound $m_U^*$ are adapted consistently with the selected interval (step S98) and the process loops at step S86.

If the required accuracy is reached, the process continues at step S96 where quantizers are selected in a pool of quantizers predetermined at step S87 and associated with points of the optimal rate-distortion curves already used (see explanations relating to step S8 in FIG. 11), based on the distortion values $D_{n,k,*}^2$ obtained during the last iteration of the dichotomy process (step S90 described above).

These selected quantizers may be used for encoding coefficients in an encoding process or in the frame of a segmentation optimization method as described below (see step S104 in particular).

The process just described for determining optimal quantizers uses a function e(m*) resulting in an encoded frame having a given video merit (denoted $\mu^{VIDEO}$ above), with the possible influence of balancing parameters $\theta_*$.

As a possible variation, it is possible to use a different function e(m*), which will result in the encoded frame fulfilling a different criterion. For instance, if it is sought to obtain a target distortion $D_t^2$, the function $e(m^*) = D_*^2(m^*) - D_t^2$ could be used instead.

In a similar manner, if it is sought to control the rate of a frame (for a given component) to a target rate $R_t$, the function $e(m^*) = R_*(m^*) - R_t$ could be used. In this case, step S90 would include determining the rate for encoding each of the various channels (also considering each of the various blocks of the current segmentation) using the rate-distortion curves (S89) and step S92 would include summing the determined rates to obtain the rate $R_*$ for the frame.

In addition, although the process of FIG. 14 has been described in the context of a video sequence with three colour components, it also applies in the context of a video sequence with a single colour component, e.g. luminance, in which case no balancing parameter is used ($\theta_* = 1$, which is by the way the case for the luminance component in the example just described where $\theta_Y$ was defined as equal to 1).

Figure 15:
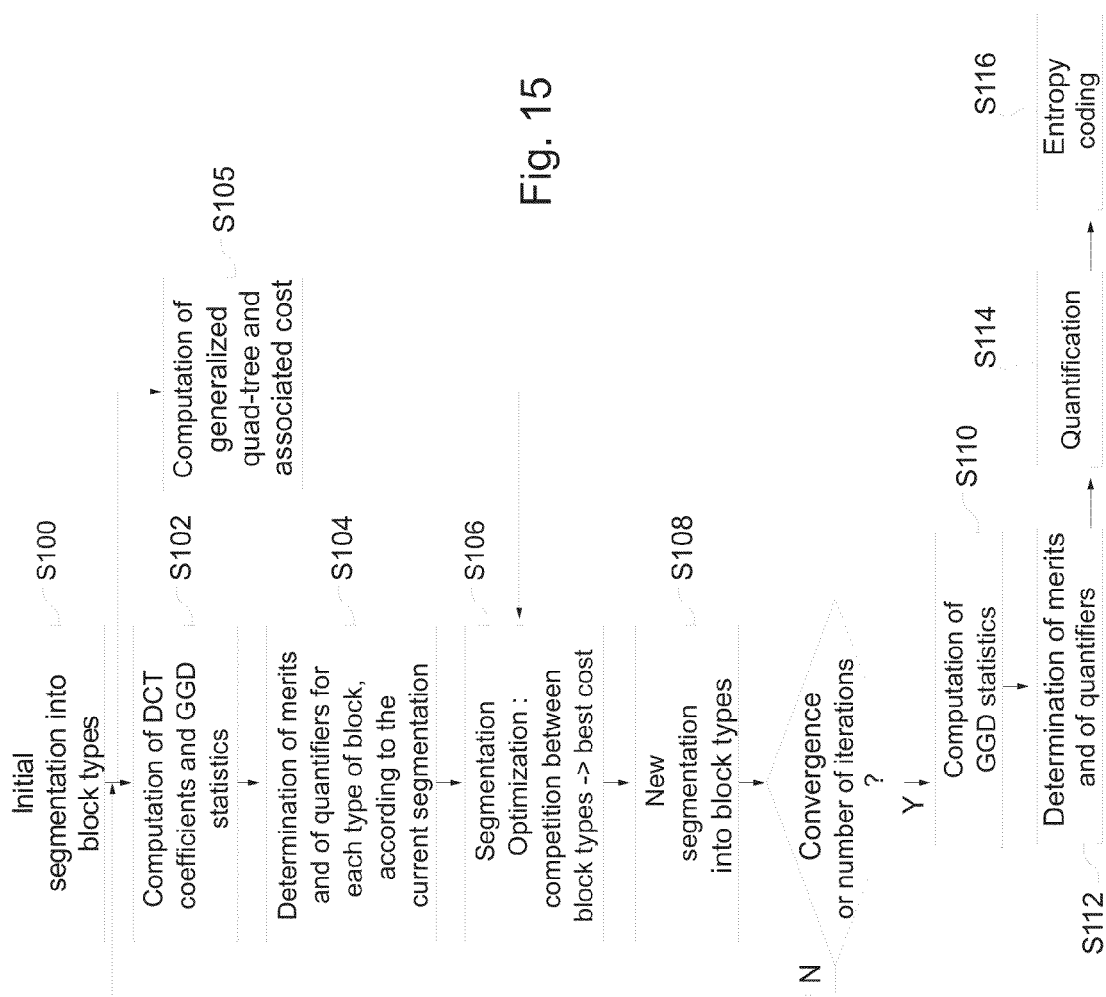
FIG. 15 shows an exemplary embodiment of an encoding process according to the teachings of the invention.

FIG. 15 shows an exemplary embodiment of an encoding process according to the teachings of the invention. As briefly mentioned above, the process is an optimization process using the processes described above, in particular one of the two embodiments described respectively with reference to FIGS. 13 and 14.

This process applies here to a video sequence comprising a luminance component Y and two luminance components U,V.

The process starts at step S100 with determining an initial segmentation for the luminance component Y based on the content of the blocks of the frame, e.g. in accordance with the initial segmentation method described above using a measure of residual activity. As already explained, this segmentation defines a block type for each block obtained by the segmentation, which block type refers not only to the size of the block but also to other possible parameters, such as a label derived for instance from the measure of residual activity.

It is possible in addition to force this initial segmentation to provide at least one block for each possible block type (except possibly for the block types having a skip-label), for instance by forcing some blocks to have the block types not encountered by use of the segmentation method based on residual activity, whatever the content of these blocks. As will be understood from the following description, forcing the presence of each and every possible block type in the segmentation makes it possible to obtain statistics and optimal quantizers for each and every block type and thus to enlarge the field of the optimization process.

The process then enters a loop (optimization loop).

At step S102, DCT coefficients are computed for blocks defined in the current segmentation (which is the initial segmentation the first time step S102 is implemented) and, for each block type, parameters (GGD statistics) representing the probabilistic distributions of the various DCT channels are computed. This is done in conformity with steps S4 and S6 of FIG. 11 described above.

The computation of DCT coefficients and GGD statistics is performed for the luminance component Y and for chrominance components U,V (each time using the same current segmentation associating a block type to each block of the segmentation).

Frame merits ($m^Y$, $m^{UV}$ in the first embodiment, m* in the second embodiment), block merits $m_k$ (for each block type) and optimal quantizers for the various block types and DCT channels can thus be determined at step S104 thanks to either the process of FIG. 13 or the process of FIG. 14.

These elements can then be used at step S106 in an encoding cost competition between possible segmentations, each defining a block type for each block of the segmentation. It may be noted that block types with a skip label, i.e. corresponding to non-encoded blocks, may easily be introduced at this stage (when they are not considered at the time of determining the initial segmentation) as their distortion equals the distortion of the block in the base layer and their rate is null.

It is proposed here to use a Lagrangian cost of the type $$\frac{D}{\lambda} + R,$$

or in an equivalent manner $$\frac{D^2}{\lambda} + R,$$

(as an encoding cost in the encoding cost competition) computed from the bit rate needed for encoding by using the quantizers of the concerned (competing) block type and the distortion after quantization and dequantization by using the quantizers of the concerned (competing) block type. As a possible variation, the encoding cost may be estimated differently, such as for instance using only the bit rate just mentioned (i.e. not taking into account the distortion parameter).

The Lagrangian cost generated by encoding blocks having a particular block type will be estimated as follows.

The cost of encoding for the luminance is $$\frac{\delta_{P,k,Y}^2}{\lambda} + R_{k,Y}$$

where $\delta_{P,k,Y}^2$ is the pixel distortion for the block type k introduced above and $R_{k,Y}$ is the associated rate.

It is known that, as rate and distortion values are constrained on a given rate-distortion curve, Lagrange's parameter can be written as follows:

$$\lambda = -\frac{\partial \delta_{P,k,Y}^2}{\partial R_{k,Y}}$$

and thus approximated as follows:

$$\lambda \approx -\frac{\Delta \delta_{P,k,Y}^2}{\Delta R_{k,Y}} = m_k v_k^Y \cdot m^Y$$

(where $v_k^Y$ is the number of blocks of the given block type per area unit in the luminance frame).

It is thus proposed to estimate the luminance cost as follows:

$$C_{k,Y} = \frac{\delta_{P,k,Y}^2}{v_k^Y \cdot m^Y} + R_{k,Y} + R_{k,QT},$$

where $R_{k,QT}$ is the bit rate associated to the parsing of the generalized quad-tree (representing the segmentation) to mark the type of the concerned block in the bit stream. A possible manner to encode the quad-tree in the bit stream is described below. This bit rate $R_{k,QT}$ is computed at step S105.

When using the first embodiment (FIG. 13), it is proposed to estimate the cost for chrominance components as follows.

If the cost of encoding for the chrominance is written $$\frac{\delta_{P,k,UV}^2}{\lambda} + R_{k,UV},$$

Lagrange's parameter is given by $$\lambda = -\frac{\partial \delta_{P,k,UV}^2}{\partial R_{k,UV}}$$

and can thus be approximated as:

$$\lambda \approx -\frac{\Delta \delta_{P,k,UV}^2}{\Delta R_{k,UV}}.$$

As explained for the process of FIG. 13, it is proposed here that:

the quality of luminance frames is the same as the quality of chrominance frames: $D_Y^2 = D_{UV}^2 = (D_U^2 + D_V^2)/2$, which gives at the block level:

$$\delta_{P,k,UV}^2 = \frac{\delta_{P,k,U}^2 + \delta_{P,k,V}^2}{2};$$

the merit of U chrominance frames is the same as the merit of V chrominance frames: $m^U = m^V = m^{UV}$, which results in an equal merit $v_k^{UV} \cdot m^{UV}$ for U and V frames at the block level (where $v_k^{UV}$ is the number of blocks of the given block type per area unit in the chrominance frame).

Thus, Lagrange's parameter can be estimated (based in particular on the definition of the merit) as:

$$\lambda \approx -\frac{\Delta \delta_{P,k,UV}^2}{\Delta R_{k,UV}} = -\frac{\Delta(\delta_{P,k,U}^2 + \delta_{P,k,V}^2)}{2 \cdot \Delta R_{k,UV}} = \frac{v_k^{UV} \cdot m^{UV}}{2} \cdot \frac{\Delta(R_{k,U} + R_{k,V})}{\Delta R_{k,UV}} = \frac{v_k^{UV} \cdot m^{UV}}{2}.$$

It is thus proposed to estimate the chrominance cost as follows:

$$C_{k,UV} = \frac{2 \cdot \delta_{P,k,UV}^2}{v_k^{UV} \cdot m^{UV}} + R_{k,UV},$$

It may be noted that no rate is dedicated to a chrominance quad-tree as it is considered here that the segmentation for chrominance components follows the segmentation for the luminance frame.

Still in the frame of the first embodiment (FIG. 13), the combined cost, taking into account both luminance and chrominance, is the sum of the two associated costs. However, in order to also take into consideration the coupling between luminance and chrominance: the merit of chrominance is computed such that the quality (on the whole frame) of the chrominance matches the quality of the luminance.

As a consequence, a variation of the luminance distortion in one block has a global impact on the average distortion of the chrominance on the whole frame. Due to the quality equality, this impact is $\Delta\delta_{P,k,UV}^2 = \Delta\delta_{P,k,Y}^2$ and it is thus proposed to introduce a corresponding coupling term in the combined cost, which can thus be estimated by the following formula:

$$C_{k,YUV} = \frac{\delta_{P,k,Y}^2}{v_k^Y \cdot m^Y} + \frac{2 \cdot (\delta_{P,k,UV}^2 + \delta_{P,k,Y}^2)}{v_k^{UV} \cdot m^{UV}} + R_{k,Y} + R_{k,UV} + R_{k,QT}.$$

This formula thus makes it possible to compute the Lagrangian cost in the competition between possible segmentations mentioned above and described in more details below, in the frame of the first embodiment (FIG. 13).

When using the second embodiment (FIG. 14) where distinct frame merits $m^U$, $m^V$ are determined respectively for the U component and for the V component, the estimation of the Lagrangian cost presented above applies in a similar manner in the case of colour components U,V, except that no rate is dedicated to a chrominance quad-tree as it is considered here that the segmentation for chrominance frames follows the segmentation for the luminance frame. The Lagrangian cost for chrominance components can be estimated as follows:

$$C_{k,U} = \frac{\delta_{P,k,U}^2}{v_k^U \cdot m^U} + R_{k,U} \text{ and } C_{k,V} = \frac{\delta_{P,k,V}^2}{v_k^V \cdot m^V} + R_{k,V}.$$

The combined cost, taking into account luminance and chrominance, can thus be estimated by the following formula:

$$C_{k,YUV} = \frac{\delta_{P,k,Y}^2}{v_k^Y \cdot m^Y} + \frac{\delta_{P,k,U}^2}{v_k^U \cdot m^U} + \frac{\delta_{P,k,V}^2}{v_k^V \cdot m^V} + R_{k,Y} + R_{k,U} + R_{k,V} + R_{k,QT}.$$

This formula thus makes it possible to compute the Lagrangian cost in the competition between possible segmentations mentioned above and described in more details below, in the frame of the second embodiment (FIG. 14).

For both embodiments, the distortions $\delta_{P,k,Y}^2$, $\delta_{P,k,U}^2$ and $\delta_{P,k,V}^2$ (or $\delta_{P,k,UV}^2$ in the first embodiment) are computed in practice by applying the quantizers selected at step S104 for the concerned block type, then by applying the associated dequantization and finally by comparing the result with the original residual. This last step can e.g. be done in the DCT transform domain because the IDCT is a L2 isometry and total distortion in the DCT domain is the same as the total pixel distortion, as already explained above.

Bit-rates $R_{k,Y}$, $R_{k,U}$ and $R_{k,V}$ (or $R_{k,UV}$ in the first embodiment) can be evaluated without performing the entropy encoding of the quantized coefficients. This is because one knows the rate cost of each quantum of the quantizers; this rate is simply computed from the probability of falling into this quantum and the probability is provided by the GGD channel modeling associated with the concerned block type.

Lastly, the size (more precisely the area) of a block impacts the cost formula through the geometrical parameters $v_k^Y$, $v_k^U$ and $v_k^V$ (or $v_k^{UV}$ in the first embodiment).

For instance, in the case of a 16×16-pixel unit area and a 4:2:0 YUV colour format, the number of blocks per area unit for 16×16 blocks is $v_k^Y = 1$ for luminance blocks and $v_k^U = v_k^V = v_k^{UV} = 2$ for chrominance blocks. This last value comes from the fact that one needs two couples of 4×4 UV blocks to cover a unit area of size 16×16 pixels.

Similarly, the number of blocks per area unit for 8×8 blocks is $v_k^Y = 4$ for luminance blocks and $v_k^{UV} = 8$ for chrominance blocks.

In the case considered here were possible block sizes are 32×32, 16×16 and 8×8, the competition between possible segmentations performed at step S106 (already mentioned above) seeks to determine for each 32×32 area both:
  the segmentation of this area into 32×32, 16×16 or 8×8 blocks,
  the choice of the type for each block,
  such that the cost is minimized.

This may lead to a very big number of possible configurations to evaluate. Fortunately, by using the classical so-called bottom-to-top competition technique (based on the additivity of costs), one can dramatically decrease the number of configurations to deal with.

Figure 16:
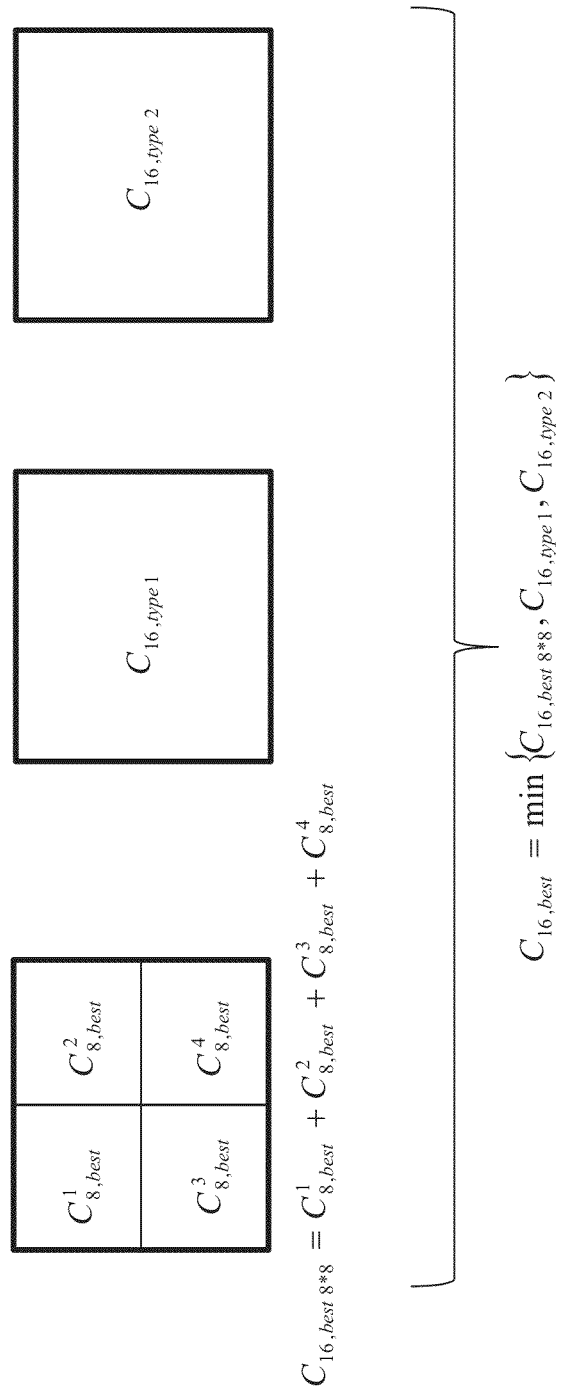
FIG. 16 illustrates a bottom-to-top algorithm used in the frame of the encoding process of FIG. 15.

As shown in FIG. 16 (left part), a 16×16 block is segmented into four 8×8 blocks. By using 8×8 cost competition (where the cost for each 8×8 block is computed based on the above formula for each possible block types of size 8×8, including for the block type having a skip label, for which the rate is nil), the most competitive type (i.e. the type with the smallest cost) can be selected for each 8×8 block. Then, the cost $C_{16,best8*8}$ associated with the 8×8 (best) segmentation is just the addition of the four underlying best 8×8 costs.

The bottom-to-top process can be used by comparing this best cost $C_{16,best8*8}$ using 8×8 blocks for the 16×16 block to costs computed for block types of size 16×16.

FIG. 15 is based on the assumption (for clarity of presentation) that there are two possible 16×16 block types. Three costs are then to be compared:
  the best 8×8 cost $C_{16,best8*8}$ deduced from cost additivity;
  the 16×16 cost $C_{16,type1}$ using 16×16 block type 1;
  the 16×16 cost $C_{16,type2}$ using 16×16 block type 2.

The smallest cost among these 3 costs decides the segmentation and the types of the 16×16 block.

The bottom-to-top process is continued at a larger scale (in the present case where 32×32 blocks are to be considered); it may be noted that the process could have started at a lower scale (considering first 4×4 blocks). In this respect, the bottom-to-top competition is not limited to two different sizes, not even to square blocks.

By doing so for each 32×32 block of the frame, it is thus possible to define a new segmentation, defining a block type for each block of the segmentation (step S108).

Then, if the segmentation does not evolve anymore (i.e. if the new segmentation is the same as the previous segmentation) or if a predetermined number of iterations has been reached, the process quits the loop and step S110 (described below) is proceeded with. Else, the process loops to step S102 where DCT coefficients and GGD statistics will be computed based on the new segmentation.

It may be noted in this respect that the loop is needed because, after the first iteration, the statistics are not consistent anymore with the new segmentation (after having performed block type competition). However, after a small number of iterations (typically from 5 to 10), one observes a convergence of the iterative process to a local optimum for the segmentation.

The block type competition helps improving the compression performance of about 10%.

At step S110, DCT coefficients are computed for the blocks defined in the (optimized) segmentation resulting from the optimization process (loop just described), i.e. the new segmentation obtained at the last iteration of step S108 and, for each block type defined in this segmentation, parameters (GGD statistics) representing the probabilistic distributions of the various DCT channels are computed. As noted above, this is done in conformity with steps S4 and S6 of FIG. 11 described above.

Frame merits ($m^Y$, $m^{UV}$ in the first embodiment, m* in the second embodiment), block merits $m_k$ (for each block type) and optimal quantizers for the various block types and DCT channels can thus be determined at step S112 thanks to the process of FIG. 13 (first embodiment) or FIG. 14 (second embodiment), using GGD statistics provided at step S110 and based on the optimized segmentation.

The DCT coefficients of the blocks of the frames (which coefficients where computed at step S110) are then quantized at step S114 using the selected quantizers.

The quantized coefficients are then entropy encoded at step S116 by any known coding technique like VLC coding or arithmetic coding. Context adaptive coding (CAVLC or CABAC) may also be used.

A bit stream to be transmitted can thus be computed based on encoded coefficients. The bit stream also includes parameters $\alpha_i$, $\beta_i$ representative of the statistical distribution of coefficients computed at step S110, as well as a representation of the segmentation (quad-tree) determined by the optimization process described above.

It is proposed to encode the segmentation of the frame into block types using the syntax of a quad-tree, here a generalized quad-tree with a plurality of (more than two) values per level:
  at the level of 32×32 blocks, the following values can be taken: 0 for a skip label, 1 for label 1, etc., $N_{32}$ for label $N_{32}$ and $N_{32}$+1 for a block split into smaller (here 16×16) blocks;
  at the level of 16×16 blocks, the following values can be taken: 0 for a skip label, 1 for label 1, etc., $N_{16}$ for label $N_{16}$ and $N_{16}$+1 for a block split into smaller (here 8×8) blocks
  at the level of 8×8 blocks, the following values can be taken: 0 for a skip label, 1 for label 1, etc., $N_8$ for label $N_8$.

The generalized quad-tree may then be compressed using an arithmetic entropy coder associating the conditional probability $p(L|s_B)$ to each label L, where $s_B$ is the state of the co-located block in the base layer, for instance computed based on the pixel morphological energy of the co-located base layer block. The various possible conditional probabilities are for instance determined during the encoding cost competition process described above.

A representation of the probabilities $p(L|s_B)$ is sent to the video decoder 30 (in the bit stream) to ensure decodability of the quad-tree by a context-free arithmetic decoder. This representation is for instance a table giving the probability $p(L|s_B)$ for the various labels L and the various states $s_B$ considered. Indeed, as the video decoder 30 decodes the base layer, it can compute the state of the co-located block in the base layer and thus determine, using the received table, the probabilities respectively associated to the various labels L for the computed state; the arithmetic decoder then works using these determined probabilities to decode the received quad-tree.

The bit stream may also include frame merits $m^Y$, $m^U$ $m^V$ (or $m^{UV}$) determined at step S112.

Transmitting the frame merits makes it possible to select the quantizers for dequantization at the decoder according to a process similar to FIG. 12 (with respect to the selection of quantizers), without the need to perform the dichotomy process.

According to a first possible embodiment (as just mentioned), the transmitted parameters may include the parameters defining the distribution for each DCT channel, i.e. the parameter α (or equivalently the standard deviation σ) and the parameter β computed at the encoder side for each DCT channel, as shown in step S22.

Based on these parameters received in the data stream, the decoder may deduce the quantizers to be used (a quantizer for each DCT channel) thanks to the selection process explained above at the encoder side (the only difference being that the parameters β are for instance computed from the original data at the encoder side whereas they are received at the decoder side).

Dequantization (step 332 of FIG. 4) can thus be performed with the selected quantizers (which are the same as those used at encoding because they are selected the same way).

According to a second possible embodiment, the transmitted parameters may include a flag per DCT channel indicating whether the coefficients of the concerned DCT channel are encoded or not, and, for encoded channels, the parameters β and the standard deviation σ (or equivalently the parameter α). This helps minimizing the amount of information to be sent because channel parameters are sent only for encoded channels. According to a possible variation, in addition to flags indicating whether the coefficients of a given DCT channel are encoded or not, information can be transmitted that designates, for each encoded DCT channel, the quantizer used at encoding. In this case, there is thus no need to perform a quantizer selection process at the decoder side.

Dequantization (step 332 of FIG. 4) can thus be performed at the decoder by use of the identified quantizers for DCT channels having a received flag indicating the DCT channel was encoded.

Figure 17:
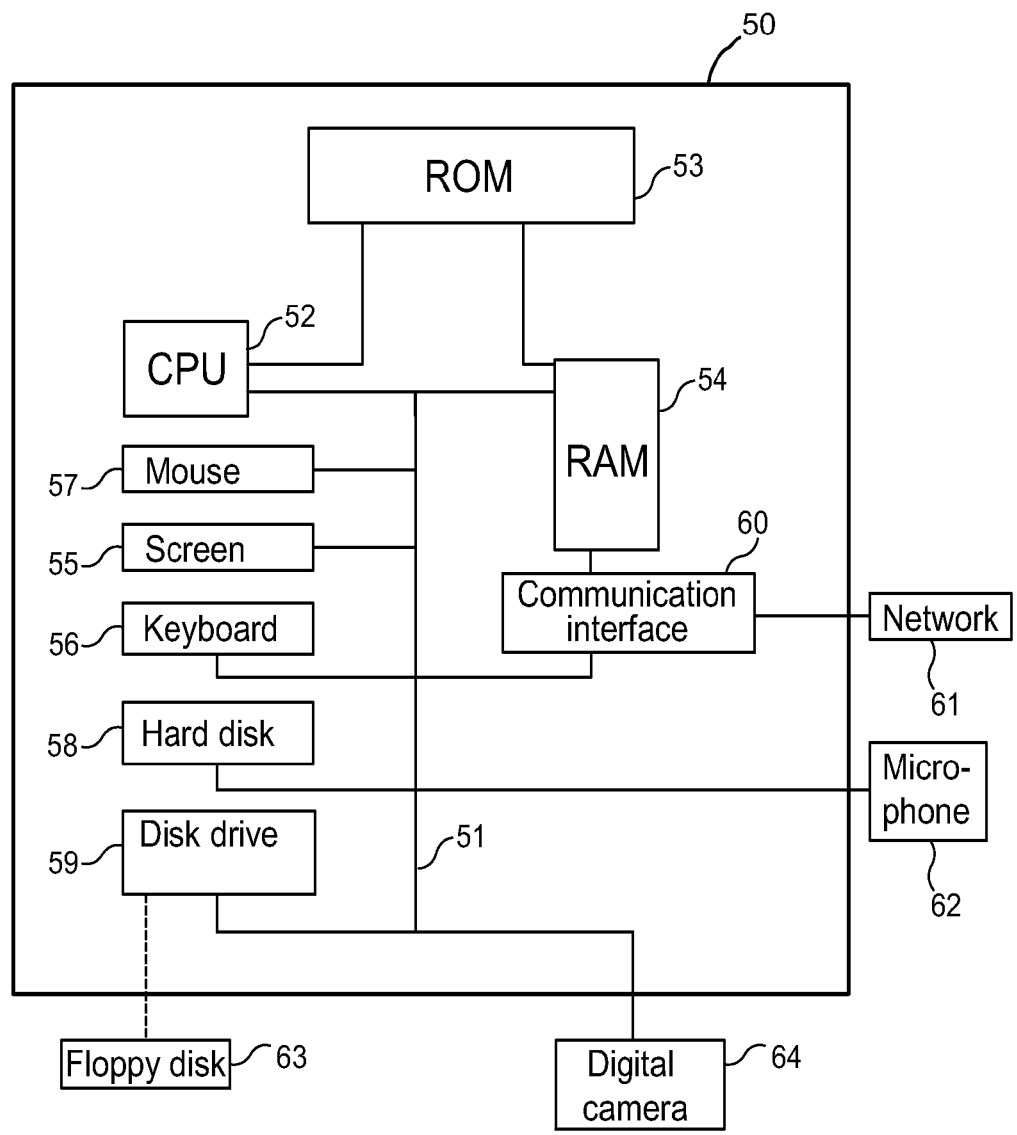
FIG. 17 shows a particular hardware configuration of a device able to implement methods according to the invention.

With reference now to FIG. 17, a particular hardware configuration of a device for encoding or decoding images able to implement methods according to the invention is now described by way of example.

A device implementing the invention is for example a microcomputer 50, a workstation, a personal digital assistant, or a mobile telephone connected to various peripherals. According to yet another embodiment of the invention, the device is in the form of a photographic apparatus provided with a communication interface for allowing connection to a network.

The peripherals connected to the device comprise for example a digital camera 64, or a scanner or any other image acquisition or storage means, connected to an input/output card (not shown) and supplying image data to the device.

The device 50 comprises a communication bus 51 to which there are connected:
  a central processing unit CPU 52 taking for example the form of a microprocessor;
  a read only memory 53 in which may be contained the programs whose execution enables the methods according to the invention. It may be a flash memory or EEPROM;

a random access memory 54, which, after powering up of the device 50, contains the executable code of the programs of the invention necessary for the implementation of the invention. As this memory 54 is of random access type (RAM), it provides fast access compared to the read only memory 53. This RAM memory 54 stores in particular the various images and the various blocks of pixels as the processing is carried out (transform, quantization, storage of the reference images) on the video sequences;

a screen 55 for displaying data, in particular video and/or serving as a graphical interface with the user, who may thus interact with the programs according to the invention, using a keyboard 56 or any other means such as a pointing device, for example a mouse 57 or an optical stylus;

a hard disk 58 or a storage memory, such as a memory of compact flash type, able to contain the programs of the invention as well as data used or produced on implementation of the invention;

an optional diskette drive 59, or another reader for a removable data carrier, adapted to receive a diskette 63 and to read/write thereon data processed or to process in accordance with the invention; and a communication interface 60 connected to the telecommunications network 61, the interface 60 being adapted to transmit and receive data.

In the case of audio data, the device 50 is preferably equipped with an input/output card (not shown) which is connected to a microphone 62.

The communication bus 51 permits communication and interoperability between the different elements included in the device 50 or connected to it. The representation of the bus 51 is non-limiting and, in particular, the central processing unit 52 unit may communicate instructions to any element of the device 50 directly or by means of another element of the device 50.

The diskettes 63 can be replaced by any information carrier such as a compact disc (CD-ROM) rewritable or not, a ZIP disk or a memory card. Generally, an information storage means, which can be read by a micro-computer or microprocessor, integrated or not into the device for processing a video sequence, and which may possibly be removable, is adapted to store one or more programs whose execution permits the implementation of the method according to the invention.

The executable code enabling the coding device to implement the invention may equally well be stored in read only memory 53, on the hard disk 58 or on a removable digital medium such as a diskette 63 as described earlier. According to a variant, the executable code of the programs is received by the intermediary of the telecommunications network 61, via the interface 60, to be stored in one of the storage means of the device 50 (such as the hard disk 58) before being executed.

The central processing unit 52 controls and directs the execution of the instructions or portions of software code of the program or programs of the invention, the instructions or portions of software code being stored in one of the aforementioned storage means. On powering up of the device 50, the program or programs which are stored in a non-volatile memory, for example the hard disk 58 or the read only memory 53, are transferred into the random-access memory 54, which then contains the executable code of the program or programs of the invention, as well as registers for storing the variables and parameters necessary for implementation of the invention.

It will also be noted that the device implementing the invention or incorporating it may be implemented in the form of a programmed apparatus. For example, such a device may then contain the code of the computer program(s) in a fixed form in an application specific integrated circuit (ASIC).

The device described here and, particularly, the central processing unit 52, may implement all or part of the processing operations described in relation with FIGS. 1 to 16, to implement methods according to the present invention and constitute devices according to the present invention.

The above examples are merely embodiments of the invention, which is not limited thereby.

What is claimed is:

1. A method for segmenting a frame of pixels into a plurality of blocks each having a block type, comprising the steps of:
    a) performing an initial segmentation of the frame into a set of initial blocks, thus determining, for each initial block, a block type associated with the concerned initial block;
    b) determining, for each block type, an associated set of quantizers based on data corresponding to pixels of blocks having said block type;
    c) selecting, among a plurality of possible segmentations defining an association between each block of this segmentation and an associated block type, the segmentation which minimizes an encoding cost estimated based on a measure of the rate necessary for encoding each block using the set of quantizers associated with the block type of the encoded block according to the concerned segmentation.

2. A method according to claim 1, wherein the encoding cost combines said measure of the rate and a measure of the distortion generated by encoding and decoding each block using the set of quantizers associated with the block type of the encoded block according to the concerned segmentation.

3. A method according to claim 1, wherein steps b) and c) are iterated and wherein the segmentation used at an iteration of step b) is the segmentation selected at the preceding iteration of step c).

4. A method according to claim 3, wherein steps b) and c) are iterated until a convergence criterion is detected or a predetermined number of iterations is reached.

5. A method according to claim 1, wherein said encoding cost is a Lagrangian cost.

6. A method according to claim 1, wherein the encoding cost is computed using an encoding merit at the frame level and a number of blocks per area unit for the concerned block type.

7. A method according to claim 1, wherein the measure of the rate is computed based on the set of quantizers associated with the concerned block type and on parameters representative of statistical distributions of transformed coefficients of blocks having the concerned block type.

8. A method according to claim 1, wherein the encoding cost includes a cost for luminance, taking into account luminance distortion generated by encoding and decoding a luminance block using the set of quantizers associated with the concerned block type, and a cost for chrominance, taking into account chrominance distortion generated by encoding and decoding a chrominance block using the set of quantizers associated with the concerned block type, and wherein said luminance distortion and said chrominance distortion are linked by a predetermined relationship.

9. A method according to claim 1, wherein the step of selecting the segmentation includes processing a part of said frame, said part having a first size, by:

for each of a plurality of blocks having a second size and partitioning said part, selecting the block type corresponding to said second size and which minimizes, by use of the associated set of quantizers, the encoding cost for the concerned block;

summing the minimized encoding costs thus obtained over said plurality of blocks;

comparing the summed encoding costs with at least an encoding cost for said part obtained by use of a set of quantizers associated with a block type corresponding to said first size.

10. A method according to claim 1, wherein step b) includes:

transforming pixel values for said blocks having said block type into a set of coefficients each having a coefficient type;

determining, for each coefficient type, at least one parameter representative of a probabilistic distribution of coefficients having the concerned coefficient type;

selecting, for each coefficient type, a quantizer depending on the parameter for the concerned coefficient type and on a block merit associated with said block type.

11. A method according to claim 1, wherein the selected segmentation is represented as a quad-tree having a plurality of levels, each associated with a block size, and leaves associated with blocks and having a value indicating either a label for the concerned block or a subdivision of the concerned block.

12. A method according to claim 11, comprising a step of compressing the quad-tree using an arithmetic entropy coding.

13. A method for encoding a frame of pixels comprising the following steps:

segmenting a frame of pixels into a plurality of blocks each having a block type using a method according to claim 1;

for each block, transforming pixel values into a set of coefficients each having a coefficient type;

for each block type, determining, for each coefficient type, at least one parameter representative of a probabilistic distribution of coefficients having the concerned coefficient type;

for each block type, selecting, for each coefficient type, a quantizer depending on the parameter for the concerned coefficient type and on a block merit associated with the concerned block type;

for each block, quantizing at least one coefficient having a given coefficient type using the quantizer selected for this given coefficient type and for the block type of the concerned block;

coding the quantized coefficients.

14. A device for processing data representing a frame of pixels, thereby segmenting said frame of pixels into a plurality of blocks each having a block type, comprising:

a module for performing an initial segmentation of the frame into a set of initial blocks, thus determining, for each initial block, a block type associated with the concerned initial block;

a determination module for determining, for each block type, an associated set of quantizers based on data corresponding to pixels of blocks having said block type;

a selection module for selecting, among a plurality of possible segmentations defining an association between each block of this segmentation and an associated block type, the segmentation which minimizes an encoding cost estimated based on a measure of the rate necessary for encoding each block using the set of quantizers associated with the block type of the encoded block according to the concerned segmentation.

15. A processing device according to claim 14, wherein the encoding cost combines said measure of the rate and a measure of the distortion generated by encoding and decoding each block using the set of quantizers associated with the block type of the encoded block according to the concerned segmentation.

16. A processing device according to claim 14, adapted to control the determination module to use a segmentation selected by the selection module.

17. A processing device according to claim 16, adapted to control the determination module and the selection module to operate successively until a convergence criterion is detected or a predetermined number of iterations is reached.

18. A processing device according to claim 14, wherein said encoding cost is a Lagrangian cost.

19. A processing device according to claim 14, comprising a module for computing the encoding cost using an encoding merit at the frame level and a number of blocks per area unit for the concerned block type.

20. A processing device according to claim 14, comprising a module for computing the measure of the rate based on the set of quantizers associated with the concerned block type and on parameters representative of statistical distributions of transformed coefficients of blocks having the concerned block type.

21. A processing device according to claim 14, wherein the encoding cost includes a cost for luminance, taking into account luminance distortion generated by encoding and decoding a luminance block using the set of quantizers associated with the concerned block type, and a cost for chrominance, taking into account chrominance distortion generated by encoding and decoding a chrominance block using the set of quantizers associated with the concerned block type, and wherein said luminance distortion and said chrominance distortion are linked by a predetermined relationship.

22. A processing device according to claim 14, wherein the selection module is adapted to process a part of said frame, said part having a first size, by:

for each of a plurality of blocks having a second size and partitioning said part, selecting the block type corresponding to said second size and which minimizes, by use of the associated set of quantizers, the encoding cost for the concerned block;

summing the minimized encoding costs thus obtained over said plurality of blocks;

comparing the summed encoding costs with at least an encoding cost for said part obtained by use of a set of quantizers associated with a block type corresponding to said first size.

23. A processing device according to claim 14, wherein the determination module includes:

a module for transforming pixel values for said blocks having said block type into a set of coefficients each having a coefficient type;

a module for determining, for each coefficient type, at least one parameter representative of a probabilistic distribution of coefficients having the concerned coefficient type;

a module for selecting, for each coefficient type, a quantizer depending on the parameter for the concerned coefficient type and on a block merit associated with said block type.

24. A processing device according to claim 14, comprising a module for storing a quad-tree representing the selected segmentation, said quad-tree having a plurality of levels, each associated with a block size, and leaves associated with blocks and having a value indicating either a label for the concerned block or a subdivision of the concerned block.

25. A processing device according to claim 24, comprising a module for compressing the quad-tree using an arithmetic entropy coder.

26. A device for encoding a frame of pixels comprising:
a module for segmenting a frame of pixels into a plurality of blocks each having a block type using a device according to claim 14;
a module for transforming, for each block, pixel values into a set of coefficients each having a coefficient type;
a module for determining, for each block type and for each coefficient type, at least one parameter representative of a probabilistic distribution of coefficients having the concerned coefficient type;
a module for selecting, for each block type and for each coefficient type, a quantizer depending on the parameter for the concerned coefficient type and on a block merit associated with the concerned block type;
a module for quantizing, for each block, at least one coefficient having a given coefficient type using the quantizer selected for this given coefficient type and for the block type of the concerned block;
a module for coding the quantized coefficients.

27. Information storage means, possibly totally or partially removable, able to be read by a computer system, comprising instructions for a computer program adapted to implement a method according to claim 1, when this program is loaded into and executed by the computer system.

28. Computer program product stored in a storage device and able to be read by a microprocessor, comprising portions of software code adapted to implement a method according to claim 1, when it is loaded into and executed by the microprocessor.

29. A method of encoding video data comprising:
receiving video data having a first resolution,
downsampling the received first resolution video data to generate video data having a second resolution lower than said first resolution, and encoding the second resolution video data to obtain video data of a base layer having said second resolution; and
decoding the base layer video data, upsampling the decoded base layer video data to generate decoded video data having said first resolution, forming a difference between the generated decoded video data having said first resolution and said received video data having said first resolution to generate residual data, and compressing, by a method according to claim 13, the residual data to generate video data of an enhancement layer.

30. An encoding method according to claim 29, wherein the selected segmentation is represented as a quad-tree having a plurality of levels, each associated with a block size, and leaves associated with blocks and having a value indicating either a label for the concerned block or a subdivision of the concerned block, wherein compressing the residual data includes a step of compressing the quad-tree using an arithmetic entropy coding, and wherein the arithmetic entropy coding uses, when coding the segmentation relating to a given block, conditional probabilities for the various possible leaf values depending on a state of a block in the base layer co-located with said given block.

* * * * *